United States Patent
Brigley et al.

(10) Patent No.: US 12,444,511 B1
(45) Date of Patent: Oct. 14, 2025

(54) COMPUTER SYSTEM AND METHOD FOR PREDICTING NUTRIENT LEVELS AND GENERATING TREATMENT RECOMMENDATIONS FOR COCOA TREES

(71) Applicant: INTERCONTINENTAL GREAT BRANDS LLC, East Hanover, NJ (US)

(72) Inventors: Carol Brigley, Whitehouse Station, NJ (US); Marcelinus Alfasisurya Setya Adhiwibawa, Kota Batu (ID); Andrew Carlos Kondlatsch, Curitiba (BR)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 18/653,855

(22) Filed: May 2, 2024

(51) Int. Cl.
  *G16Z 99/00* (2019.01)
  *G06N 20/00* (2019.01)

(52) U.S. Cl.
  CPC ............ *G16Z 99/00* (2019.02); *G06N 20/00* (2019.01)

(58) Field of Classification Search
  None
  See application file for complete search history.

(56) References Cited

U.S. PATENT DOCUMENTS

| 10,154,624 B2 | 12/2018 | Guan et al. |
| 10,386,296 B1 | 8/2019 | Wolf |
| 2022/0146409 A1 | 5/2022 | Hamilton |

FOREIGN PATENT DOCUMENTS

| CN | 107101971 A | 8/2017 |
| CN | 107132198 A | 9/2017 |

OTHER PUBLICATIONS

Kheng et al., "Spectral Reflectance and Physiological Studies of Cocoa Leaves in Response to Macronutrients Deficiency," 3rd International Conference on Plant Science and Physiology, University Putra Malaysia, May 21-22, 2018, 1 page.
Kheng, Tee Yei, "Integration of Precision Agriculture Strategies to Improve Cocoa Productivity and Quality," Doctoral Thesis, University Putra Malaysia, Nov. 2019, 44 pages.
Prananto et al., "Near Infrared (NIR) Spectroscopy as a Rapid and Cost-Effective Method for Nutrient Analysis of Plant Leaf Tissues," Advances in Agronomy, vol. 164, 2020, 49 pages.
Prananto et al., "Rapid and Cost-Effective Nutrient Content Analysis of Cotton Leaves Using Near-Infrared Spectroscopy (NIRS)," PeerJ, 2021, 25 pages.
Romero et al., "Nutrient Dynamic in Cocoa Leaves Under Different Nitrogen Sources: A Reference Tool for Foliar Analysis," Revista Brasileira de Fruticultura, vol. 44, 2022, 9 pages.
Azadnia et al., "New Approach for Rapid Estimation of Leaf Nitrogen, Phosphorus, and Potassium Contents in Apple Trees Using Vis/NIR Spectroscopy based on Wavelength Selection Coupled with Machine Learning," Computers and Electronics in Agriculture, vol. 207, 2023, 16 pages.
Shen et al., "Application of visible/near infrared spectrometers to quickly detect the nitrogen, phosphorus, and potassium content of chemical fertilizers," Applied Sciences, vol. 11, 2021, 11 pages.
Abderrahim, Diane et al. Enhancing Tomato Leaf Nitrogen Analysis through Portable NIR Spectrometers Combined with Machine Learning and Chemometrics. Chemometrics and Intelligent Laboratory Systems—El Sevier Science Publishers. Jul. 27, 2023. vol. 240. 9 Pages. Retrieved on Jul. 27, 2023.
Abukmeil, Reem et al. New Approach to Estimate Macro and Micronutrients in Potato Plants Based on Foliar Spectral Reflectance. Computers and Electronics in Agriculture. Jul. 1, 2022. vol. 198, p. 13. Retrieved from the Internet <URL: https://www.sciencedirect.com/science/ article/pii/S016816992200391X/pdfft?md5= 109f6314aaba4383ebc3869fdd3b2c45&pid=1-s2.0-S016816992200391X-main.pdf<.
Hafizal, Muhammad Titan et al. Implementation of Expert Systems in Potassium Deficiency in Cocoa Plants Using Forward Chaining Method. 7th International Conference on Computer Science and Computational Intelligence 2022. 2023. vol. 216. pp. 136-143.
International Bureau, International Search Report and Written Opinion mailed on Aug. 8, 2025, issued in connection with International Application No. PCT/US2025/027361, filed May 1, 2025, 14 pages.
Narayana, P. et al. Online Crop Doctor using Machine Learning and Deep Learning. Proceedings of the Second international Conference on Applied Artificial intelligence and Computing (ICAAIC 2023). May 4, 2023. pp. 1653-1659. Procoeedings of the Second International Conference on Applied Artificial Intelligence and Computing (ICAAIC 2023). Retrieved on Jun. 8, 2023.
Noguera, Miguel et al. Nutritional Status Assessment of Olive Crops by Means of the Analysis and Modelling of Multispectral Images Taken with UAVs. Biosystems Engineering—El Sevier. Sep. 17, 2021. vol. 211. 18 Pages. Retrieved on Sep. 17, 2021. DOI: 10.1016/J.BIOSYSTEMSENG.2021.08.035.
Prathik, K. et al. Deep Learning-Based Fertilizer Recommendation System Using Nutrient Deficiency Prediction. 7th International Conference on Computaton System and Information Technology for Sustainable Solutions (CSITSS). Nov. 2, 2023. 6 Pages. XP034484372, DOI: 10.1109/CSITSS60515.2023.10334122. Retrieved on Dec. 7, 2023.

*Primary Examiner* — G. Steven Vanni
(74) *Attorney, Agent, or Firm* — Lee Sullivan Shea & Smith LLP

(57) ABSTRACT

A computing platform configured to: (i) receive spectrometry data for a leaf sample of a cocoa tree; (ii) utilize a first set of one or more artificial intelligence (AI) models to predict one or more nutrient levels for the leaf sample based on the spectrometry data; (iii) utilize a second set of one or more AI models to generate one or more recommendations for treating the cocoa tree based on the one or more nutrient levels; and (iv) cause the one or more recommendations to be presented to an individual involved in managing the cocoa tree.

21 Claims, 7 Drawing Sheets

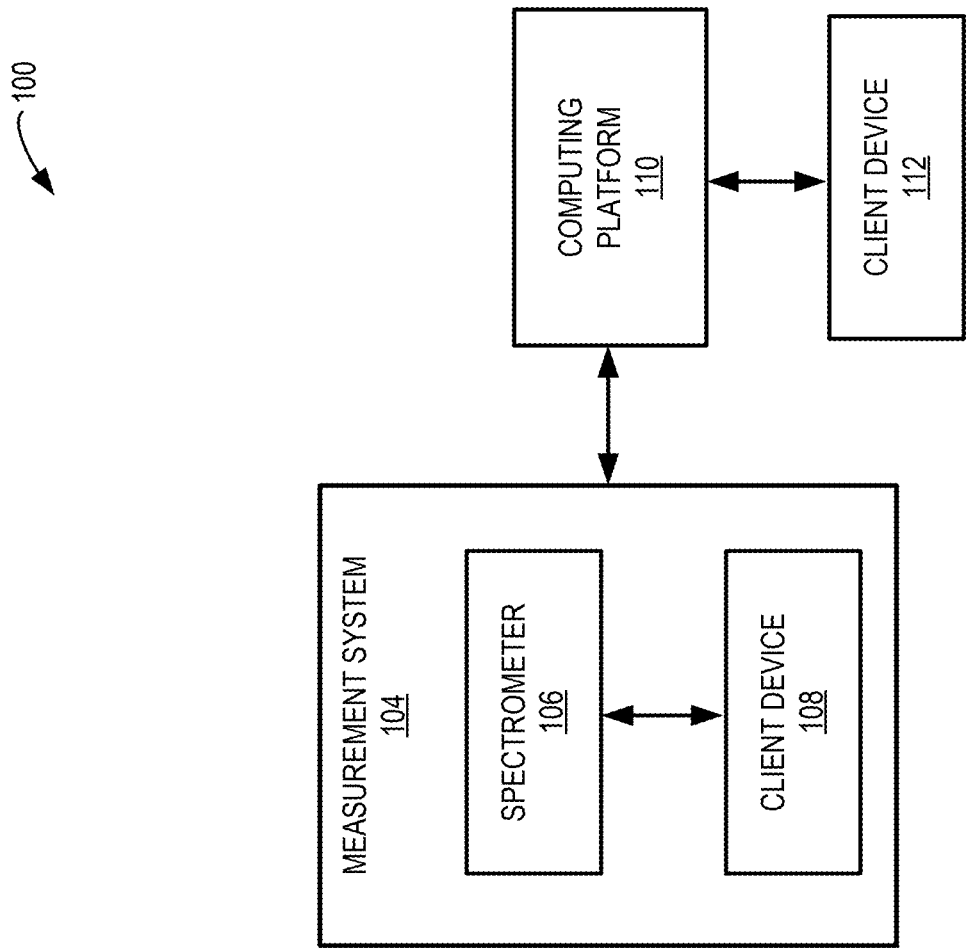
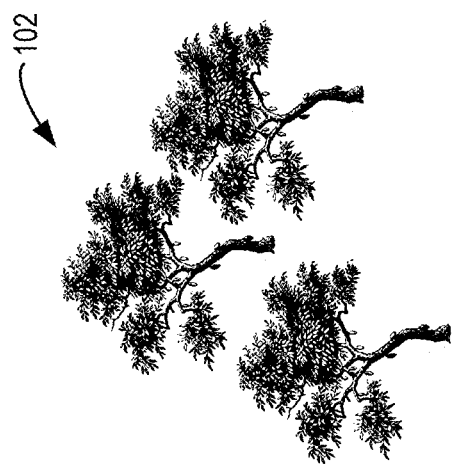
FIG. 1

COMPUTER SYSTEM AND METHOD FOR PREDICTING NUTRIENT LEVELS AND GENERATING TREATMENT RECOMMENDATIONS FOR COCOA TREES

BACKGROUND

Cocoa trees are cultivated in any of various parts of the world where suitable environmental conditions (e.g., tropical climates where there is ample annual precipitation) exist naturally or can be created artificially (e.g., in greenhouses). In this respect, the cocoa trees may have any of various different ages and sizes.

Cocoa trees may produce cacao pods that contain cocoa beans, which, in turn, may be used to make food products such as chocolate, cocoa butter, chocolate liquor, and cocoa solids. Throughout many parts of the world, there is a high demand for such food products. For example, in the United States alone, about three billion kilograms of chocolate products are consumed annually. Given the demand that exists for the food products that cocoa is used to make, cocoa trees are a valuable agricultural asset. Further, the amount and quality of cocoa beans that are produced by a given cocoa tree (sometimes referred to as the "yield" of the cocoa tree) generally depend on the health of the given cocoa tree. In this respect, a healthy tree will typically produce more cocoa beans and/or higher-quality cocoa beans than an unhealthy tree, leading to a greater return on investment for people (e.g., farmers) who own and maintain cocoa trees.

SUMMARY

Disclosed herein is new technology for predicting one or more nutrient levels (e.g., nitrogen, phosphorus, potassium, and/or water) of a cocoa tree and then producing one or more recommendations for treating the cocoa tree based on the predicted one or more nutrient levels. One of ordinary skill in the art will appreciate these as well as numerous other aspects in reading the following disclosure.

In one aspect, the disclosed technology may take the form of a method to be carried out by a computing platform that involves (i) receiving spectrometry data for a leaf sample of a cocoa tree; (ii) utilizing a first set of one or more artificial intelligence (AI) models to predict one or more nutrient levels for the leaf sample based on the spectrometry data; (iii) utilizing a second set of one or more AI models to generate one or more recommendations for treating the cocoa tree based on the one or more nutrient levels; and (iv) causing the one or more recommendations to be presented to an individual involved in managing the cocoa tree.

The one or more recommendations may take any of various forms. As one possibility, in at least some implementations, the one or more recommendations may comprise at least one of: a type of fertilizer to apply, an amount of fertilizer to apply, a form in which fertilizer is to be applied, a frequency with which fertilizer is to be applied, an ingredient to include in fertilizer to be applied, or a ratio of a first ingredient to a second ingredient in a fertilizer to be applied.

As another possibility, the one or more recommendations may comprise a treatment to be applied for a disease.

As yet another possibility, the one or more recommendations may comprise at least one of: an indication of whether water is to be supplied via irrigation, one or more forms in which water is to be supplied via irrigation, a frequency at which water is to be supplied via irrigation, an amount of water to provide each time water is supplied via irrigation, a time of day in which water is to be supplied via irrigation, or a location where water is to be supplied via irrigation relative to the given cocoa tree.

The one or more recommendations may also take other forms.

The spectrometry data may also take any of various forms. As one possibility, in at least some implementations, the spectrometry data may comprise measurements within a visible spectrum and a near-infrared (NIR) spectrum.

As another possibility, the spectrometry data may comprise measurements taken on a plurality of target points distributed in a circular pattern across a leaf in the leaf sample.

As yet another possibility, the spectrometry data may comprise measurements on one or more a leaves in the leaf sample that were prepared via a preparation process prior to collection of the spectrometry data, and wherein the preparation process comprises one or more of: rinsing the leaves, drying the leaves, or grinding the leaves into a powder.

The spectrometry data may also take other forms.

The manner in which the leaf sample is selected may also take any of various forms. As one possibility, the leaf sample may be selected from a middle third of a canopy of the cocoa tree. The manner in which the leaf sample is selected may also take other forms.

Further, one or more nutrients corresponding to the one or more nutrient levels may take any of various forms. As one possibility, the one or more nutrients corresponding to the one of more nutrient levels may comprise one or more of nitrogen, phosphorus, potassium, or water. The one or more nutrients may also take other forms.

Further, the first set of one or more AI models and the second set of one or more AI models may take any of various forms. As one possibility, the first set of one or more AI models may comprise a first set of one or more trained machine-learning models and the second set of one or more AI models may comprise a second set of one or more trained machine-learning models.

In another aspect, disclosed herein is a computing platform that includes at least one network interface, at least one processor, at least one non-transitory computer-readable medium, and program instructions stored on the at least one non-transitory computer-readable medium that are executable by the at least one processor such that the computing platform is configured to carry out the functions disclosed herein, including but not limited to the functions of the foregoing method.

In yet another aspect, disclosed herein is a non-transitory computer-readable medium comprising program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 1 depicts one illustrative example of an environment in which the disclosed technology may be implemented.

DETAILED DESCRIPTION

Figure 2:
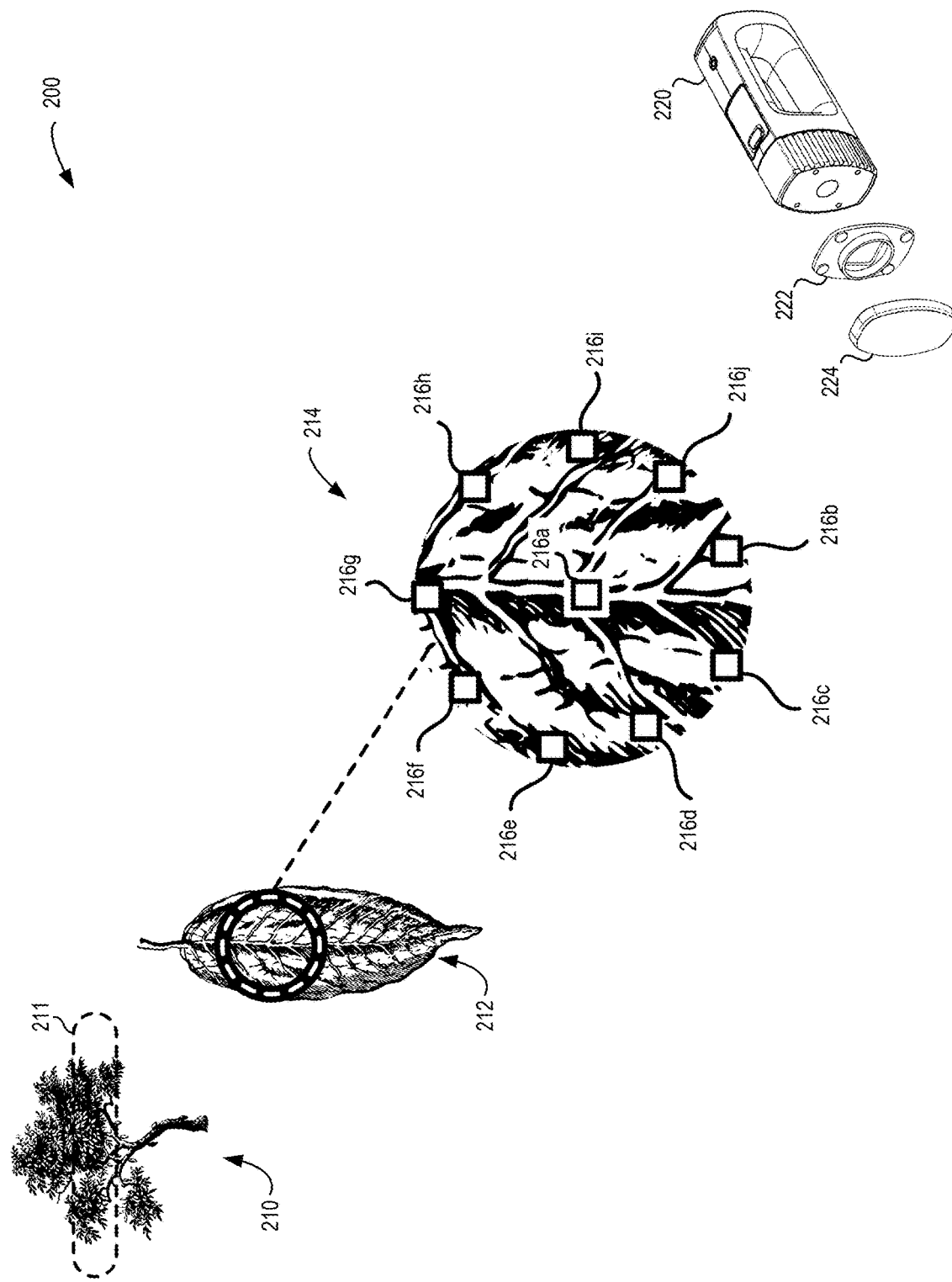
FIG. 2 depicts a diagram that illustrates one example of how a measurement system may be used to capture spectrometry data from leaves of a cocoa tree in accordance with the present disclosure.

As noted above, the amount and quality of cocoa beans that are produced by a given cocoa tree (sometimes referred to as the "yield" of the cocoa tree) generally depend on the health of the given cocoa tree. In this respect, a healthy tree will typically produce more cocoa beans and/or higher-quality cocoa beans than an unhealthy tree, leading to a greater return on investment for people (e.g., farmers) who own and maintain cocoa trees. The health of cocoa trees may be affected by many different factors, such as (but not limited to) nutrient levels, sunlight, elevation, water-related factors (e.g., Turgor pressure, humidity, drainage, watering frequency, amount of water provided via irrigation and/or precipitation), disease, pestilence, parasitic infection, tree age, and planting density (e.g., how close cocoa trees are to each other or to other plants).

Given that the yield (and therefore profitability) of cocoa trees is influenced by the factors listed above, farmers and other interested parties in the agricultural industry are incentivized to monitor and manage the health of cocoa trees by applying technology to detect when the health of cocoa trees is suboptimal so that remedial action can be taken to reduce losses in yield or cocoa-bean quality that may result if such health issues persist. Depending on whether such health issues are rooted in nutrient deficiencies, disease, and/or pestilence, various actions may be taken.

For example, some actions that may improve the health of cocoa trees suffering from poor health include applying fertilizer, water, and other treatments (e.g., fungicides, pesticides, phages, salicylic acid, antibiotics, etc.), among other possibilities. For instance, if a given cocoa tree has insufficient levels of one or more particular nutrients, fertilizer that includes those one or more particular nutrients may be added to the soil in which the given cocoa tree is planted. If the given cocoa tree is dehydrated, water may be supplied via irrigation. If the given tree is suffering from disease (e.g., a bacterial disease such as Crown Gall or Stripe, a fungal disease such as anthracnose or Witch's Broom, an oomycyte disease such as black pod rot, or a viral disease such as cocoa swollen shoot disease (CSSD)), pestilence (e.g., an insect such as cocoa mirids), or parasites (e.g., nematodes) an appropriate treatment may be applied. If health issues are detected early, these actions can also be applied early. Such early detection and intervention may be a powerful and effective strategy for reducing loss and increasing yield.

The more frequently cocoa trees can be tested for health issues, the more likely it is that health issues can be detected early and remediated promptly. However, existing technologies and techniques for assessing the health of cocoa trees have several drawbacks.

For instance, many techniques for testing nutrient levels involve excising or otherwise damaging parts of the cocoa trees in order to collect the samples to be tested, such as by removing leaves, drilling holes to extract sap, or drilling into the trunk with an increment borer to remove a core sample. Ironically, the act of applying some of these techniques to monitor a given cocoa tree's health may actually have a negative effect on the given cocoa tree's health. Drilling into the trunk of the given cocoa tree, for example, may expose the interior of the trunk to pathogens that might otherwise have been unable to penetrate the bark of the given tree. Removing leaves may also stress the given tree in a way that adversely affects yield, especially if the given cocoa tree is in an early state of development, if leaves are removed too frequently, or if too great a percentage of the given tree's leaves are removed at once.

Furthermore, existing techniques for assessing cocoa tree health generally involve using specialized lab equipment to analyze samples collected from cocoa trees. In many cases, such specialized lab equipment is expensive to own, operate, and maintain. Chromatography equipment, for example, typically costs tens of thousands of dollars and has to be operated by technicians who have to have advanced, specialized training to operate the equipment correctly. Additionally, specialized lab equipment is generally not portable (e.g., due to being large and due to having to be recalibrated after being moved), which obliges researchers to transport samples collected from cocoa trees to a remote laboratory site. Still further, samples from cocoa trees often have to be processed extensively (e.g., via drying, homogenizing, etc.) beforehand to be suitable for the types of analyses that specialized laboratory equipment performs.

In addition to the time and expense involved in sample collection, sample preparation, and sample analysis via specialized equipment, existing technologies for assessing the health of cocoa trees suffer from other deficiencies as well. For instance, existing technologies for assessing the health of cocoa trees are generally not capable of predicting accurate levels of cocoa tree nutrients in a timely and cost-effective way. Further, to the extent that existing technologies for assessing the health of cocoa trees utilize spectrometry data, such existing technologies typically focus on a more limited range of wavelengths (e.g., wavelengths below 1000 nanometers (nm)), which in turn limits the nutrient predictions that can be made. Further yet, existing technologies for assessing the health of cocoa trees do not include any technology for using predicted levels of cocoa tree nutrients to produce data-driven recommendations regarding the treatment of cocoa trees.

To address these and other problems with existing technology for assessing the health of cocoa trees, disclosed herein is new technology for predicting one or more nutrient levels (e.g., nitrogen, phosphorus, potassium, and/or water) of a cocoa tree and then producing one or more recommendations for treating the cocoa tree based on the predicted one or more nutrient levels. At a high level, the disclosed technology involves a new process for capturing spectrometry data for cocoa trees and a new predictive analytics pipeline comprising two stages: (i) a first model stage that utilizes a first set of one or more artificial intelligence (AI) models to predict one or more nutrient levels of a given cocoa tree based on spectrometry data and (ii) a second model stage that utilizes a second set of one or more AI models to generate one or more recommendations for treating the given cocoa tree. These and other aspects of the disclosed technology are described in further detail below.

The disclosed technology may provide various advantages over existing technologies for assessing the health of cocoa trees. For example, the disclosed technology predicts one or more nutrient levels (e.g., nitrogen, phosphorus, potassium, and/or water) of a cocoa tree based on spectrometry data from leaf samples taken from the cocoa trees, which allows such predictions to be made in a timely and more-cost effective manner than existing technologies. As another example, unlike the existing technologies, the disclosed technology provides data-driven recommendations regarding the treatment of cocoa trees. As yet another example, in at least some implementations, the disclosed technology allows for predictions of nutrient levels to be made without even removing the leaf samples from the cocoa trees by capturing spectrometry data from leaf samples in the field using a portable measurement system, which improves efficiency (e.g., because there is no need to transport the leaves to an off-site measurement location), reduces the amount of training involved for technicians (e.g., by allowing a portable spectrometer that is easier to operate to be used), and avoids damaging cocoa trees. As still another example, in at least some implementations, the disclosed technology enables spectrometry data for a wider range of wavelengths (e.g., between 350 nm and 2500 nm) to be captured and then used to render predictions of nutrient levels, which may in turn improve the accuracy of the nutrient-level predictions and/or enable predictions for a wider range of nutrients. As a further example, the disclosed technology includes new techniques for selecting and sampling leaves of a cocoa tree. Other advantages of the disclosed technology are also highlighted below.

Turning now to the figures, FIG. 1 depicts one illustrative example of an environment 100 in which the disclosed technology may be implemented. As shown, the environment 100 includes cocoa trees 102, a measurement system 104 for measuring certain aspects of cocoa trees, a computing platform 110 installed with software for evaluating the health of cocoa trees, and a client device 112 associated with an individual involved in managing and overseeing the health of the cocoa trees 102 (e.g., a farmer or owner of the cocoa trees 102), among other possibilities.

Cocoa trees 102 may comprise cocoa trees that are cultivated in any of various parts of the world where suitable environmental conditions (e.g., tropical climates where there is ample annual precipitation) exist naturally or can be created artificially (e.g., in greenhouses). In this respect, the cocoa trees 102 may have any of various different ages and sizes.

In line with the discussion above, cocoa trees 102 may produce cacao pods that contain cocoa beans, which, in turn, may be used to make food products such as chocolate, cocoa butter, chocolate liquor, and cocoa solids. Further, in line with the discussion above, the amount and quality of cocoa beans that are produced by a given one of the cocoa trees 102 (sometimes referred to as the "yield" of the cocoa tree) generally depend on the health of the given one of the cocoa tree 102. In this respect, a healthy tree will typically produce more cocoa beans and/or higher-quality cocoa beans than an unhealthy tree, leading to a greater return on investment for people (e.g., farmers) who own and maintain cocoa trees. The health of cocoa trees may be affected by many different factors, such as (but not limited to) nutrient levels, sunlight, elevation, water-related factors (e.g., Turgor pressure, humidity, drainage, watering frequency, amount of water provided via irrigation and/or precipitation), disease, pestilence, parasitic infection, tree age, and planting density (e.g., how close cocoa trees are to each other or to other plants).

For instance, levels of nutrients such as nitrogen (N), phosphorus (P), and potassium (K) influence the growth, productivity, and overall health of cocoa trees. Nitrogen is an essential component of amino acids (and therefore proteins), chlorophyll, and nucleic acids (e.g., deoxyribonucleic acid (DNA) and ribonucleic acid (RNA)) that are instrumental for growth and metabolism in cocoa trees. Specifically, nitrogen is involved in the synthesis of enzymes and other proteins that perform life-sustaining processes such as photosynthesis, cellular respiration, and various metabolic processes. Nitrogen promotes growth, including the development of leaves and stems. As a result, nitrogen enhances growth and leaf production in cocoa trees, thereby leading to increased yield and quality of cocoa beans.

Further, phosphorus is an essential component of nucleic acids, adenosine triphosphate (ATP), and phospholipids that are instrumental for energy transfer, cell division, and membrane structure with cells that make up cocoa trees. Specifically, phosphorus is involved in photosynthesis, cellular respiration, and nutrient transport. Phosphorus promotes root development, flowering, and cacao-pod development and enhances nutrient uptake, thereby leading to increased yield and quality of cocoa beans.

Further yet, potassium is involved in multiple physiological processes that occur in cocoa trees, such as enzyme activation, osmoregulation (e.g., regulating the movement of water via osmosis), and stomatal regulation (e.g., regulating the stomata through which leaves exchange gases with surrounding air). Specifically, potassium is involved in the synthesis of polysaccharides (e.g., cellulose, which is used in cell walls) and enhances resistance to drought and disease. Additionally, potassium plays a central role in maintaining Turgor pressure with the cells of a cocoa tree, which is essential for cell expansion and leaf turgidity. Potassium promotes these and other processes in cocoa trees, thereby leading to increased yield and quality of cocoa beans.

In addition to nutrient levels, there are a number of water-related factors that may influence the health of cocoa trees. For instance, as noted above, sufficient Turgor pressure is essential for cell expansion and leaf turgidity. Humidity influences the rate at which water evaporates. The evaporation rate, in turn, may influence that amount of water that a cocoa tree consumes (e.g., as evaporation rate increases, the amount of water consumed by a cocoa tree may also increase). Water drainage in the ground where cocoa trees are planted may also influence cocoa tree health. For instance, insufficient water drainage may cause diseases (e.g., funguses) or pests (e.g., insects) to proliferate, thereby harm the health of cocoa trees. Similarly, if the watering frequency is too high (e.g., if the amount of time between successive applications of water to the soil via irrigation or precipitation is too short), disease and/or pestilence may abound. However, if the watering frequency is too low, cocoa trees may become dehydrated and produce suboptimal yields as a result. In addition, regardless of whether the watering frequency is sufficient, the total amount of water provided is also another factor. If the total amount of water provided is insufficient, the health of cocoa trees will suffer.

Notably, some of the factors listed above that influence cocoa-tree health may not be independent of each other. Turgor pressure, for example, is generally correlated with other factors such as potassium levels, watering frequency, total amount of water provided, and humidity, for example.

The measurement system 104 may generally comprise any one or more components that are configured to collect and store measurements that may be utilized to evaluate the health of cocoa trees. The one or more components of the measurement system 104 may take any of various forms.

For instance, one component of the measurement system 104 may take the form of equipment that captures measurements in the form of spectrometry data, which may be referred to herein as a "spectrometer." The spectrometer 106 may generally function by emitting electromagnetic radiation (EMR) within some spectrum of interest towards physical matter, measuring the intensity of the EMR that is absorbed by the physical matter at various wavelengths within the spectrum of interest, and then using the measured intensity to generate spectrometry data that indicates the absorbance of the physical matter at wavelengths within the spectrum of interest. In this respect, the spectrometer 106 may be used to capture spectrometry data for the cocoa trees 102, and more particularly, the cocoa leaves found on the cocoa trees 102.

The spectrometer 106 may be configured to capture spectrometry data for any of various spectrums of interest, such as the full EMR spectrum or any spectrum that is a subdivision of the EMR spectrum, examples of which may include the NIR spectrum (e.g., between 780 nm and 2500 nm), the visible spectrum (e.g., between 350 nm and 750 nm), the gamma spectrum, the X-ray spectrum, the ultraviolet spectrum, the infrared spectrum, the microwave spectrum, or any combination of one or more wavelengths and/or spectral ranges selected from any of these spectrums. For instance, as one possibility, the spectrometer 106 may be configured to capture spectrometry data for a combination of the visible and NIR spectrums (e.g., between 350 nm and 2500 nm), which may enable prediction of values for multiple different nutrients (e.g., nitrogen, phosphorus, potassium, and/or water).

Further, the spectrometer 106 may be configured to capture spectrometry data at any of various wavelengths within the spectrum of interest. To illustrate with one possible example, if the spectrum of interest comprises a combination of the visible spectrum and the NIR spectrum, the spectrometer 106 may be configured to capture spectrometry data at 1-nm increments within that spectrum of interest (e.g., 780 nm, 781 nm, etc.) or at wavelength increments of greater or less than 1 nm, among other possibilities of wavelengths that for which spectrometry data is captured within the spectrum of interest. Many other examples are possible as well.

Further yet, the spectrometer 106 may comprise any of various components, examples of which may include one or more radiation sources to generate (e.g., emit) electromagnetic radiation (e.g., in a spectrum of interest) to be applied to a sample of physical matter being evaluated, one or more monochromators for extracting one or more different wavelengths from the generated radiation, one or more sensors (e.g., detectors such as photovoltaic cells, photomultiplier tubes, photodiodes, etc.) for measuring the intensity of the radiation that is reflected from the sample, and a sample holder for holding the sample during application of the electromagnetic radiation, among other possibilities.

Still further, the spectrometer 106 could take the form of either a portable spectrometer that is designed to be taken out into the field or a non-portable spectrometer that is designed to remain in a fixed location, which is sometimes referred to as a "benchtop" spectrometer. Some representative examples of portable spectrometers may include the NeoSpectra scanner, the VIAVI MicroNIR 1700, the DLP NIRscan Nano EVM, the Texas Instruments DMD, the Spectral Engines NIR spectrometer, the Si-Ware Systems MEMS-based FT-NIR spectrometer, the SouthNest Technology MEMS-based FTNIR spectrometer, and the Hamamatsu Photonics C15511-01, among others. Further, some representative examples of benchtop spectrometers may include the MSE PRO Lab NIR Spectrometer 450, the PerkinElmer FT 9700™, and the MB3600 FT-NIR Laboratory Analyzer for QA/QC by ABB Analytical Measurements, among others.

The spectrometer 106 may take various other forms as well.

The spectrometry data captured by the spectrometer 106 may be transmitted via one or more communication paths (e.g., between the spectrometer 106 and the client device 108 and/or between the client device 108 and the computing platform 110, as described further below) to a database or some other type of data store (e.g., in a data storage layer as described further below with respect to the computing platform 110). The stored spectrometry data may include measurement data for each wavelength value for which measurements were made and sample identification data (e.g., identifiers associated with the measurement data to specify the leaf sample to which each measurement corresponds). The stored spectrometry data may be further processed and/or merged with other data (e.g., records of treatments provided to cocoa trees from which the leaf samples were taken, classifications of the leaf samples, etc.) to generate feature values to be used as input for one or more AI models to predict one or more nutrient levels (e.g., as described further below with respect to FIG. 4). Furthermore, once the nutrient levels have been verified, the feature values and the verified nutrient levels may serve as training data for the one or more AI model (e.g., as described further below with respect to FIG. 4).

In some embodiments, the measurement system 104 may additionally include a client device 108 installed with software for interfacing with the spectrometer 106 via a communication path and thereby enabling the client device 108 to engage in various functionality related to the spectrometer 106, including controlling the operation of the spectrometer 106, obtaining spectrometry data that has been captured by the spectrometer 106, and transmitting the spectrometry data to the computing platform 110. In general, the client device 108 may include hardware components such as one or more processors, computer-readable mediums, communication interfaces, and input/output (I/O) components (or interfaces for connecting thereto), among other possible hardware components, as well the software for carrying out the functionality disclosed herein related to interfacing with the spectrometer 106 (e.g., operating system software, web browser software, a mobile application, etc.). As representative examples, the client device 108 may take the form of a desktop computer, a laptop, a netbook, a tablet, a smartphone, or a personal digital assistant (PDA), among other possibilities.

Further, the communication path between the spectrometer 106 and the client device 108 may generally comprise one or more data networks and/or data links, which may take any of various forms. For instance, the communication path between the spectrometer 106 and the client device 108 may include any one or more of a Personal Area Network (PAN) (e.g., BlueTooth®), a Local Area Network (LAN), a Wide Area Network (WAN) such as the Internet or a cellular network, a cloud network, and/or a point-to-point data link (e.g., a Near Field Communication (NFC) connection), among other possibilities, where each such data network and/or link may be wireless, wired, or some combination thereof, and may carry data according to any of various different communication protocols. Additionally, communications between the spectrometer 106 and the client device 108 could be carried out via an Application Programming Interface (API), among other possibilities. Additionally yet, although not shown, the communication path between the spectrometer 106 and the client device 108 could also include one or more intermediate systems, examples of which may include a data aggregation system or a host server, among other possibilities. Many other configurations are also possible.

It should also be understood that, in other embodiments, the measurement system 104 may comprise a spectrometer 106 without a corresponding client device 108 for interfacing with the spectrometer 106. For instance, it is possible that the spectrometer 106 may include components and functionality that allow it to be utilized without a client device (e.g., a user interface that enables a user to control the spectrometer 106, a communication interface that enables the spectrometer 106 to transmit spectrometry data to a computing platform, etc.), in which case the measurement system 104 may comprise the spectrometer 106 on its own.

The measurement system 104 may take various other forms as well.

As shown in FIG. 1, the environment 100 may further include the computing platform 110, which may comprise any one or more computer systems (e.g., one or more servers) that have been installed with software for carrying out the functionality disclosed herein related to evaluating the health of cocoa trees. In practice, the one or more computer systems of the computing platform 110 may collectively comprise some set of physical computing resources (e.g., one or more processors, data storage system, communication interfaces, etc.), which may take any of various forms. As one possibility, the computing platform 110 may comprise cloud computing resources supplied by a third-party provider of "on demand" cloud computing resources, such as Amazon Web Services (AWS), Amazon Lambda, Google Cloud, Microsoft Azure, or the like. As another possibility, the computing platform 110 may comprise "on-premises" computing resources of the given provider (e.g., servers owned by the given provider). As yet another possibility, the computing platform 110 may comprise a combination of cloud computing resources and on-premises computing resources. Other implementations of the computing platform 110 are possible as well.

Further, in practice, the software installed at the computing platform 110 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 1, the software for carrying out the functionality may interact with the data storage layer of the computing platform 110, which may comprise data stores of various different forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

The computing platform 110 may comprise various other components and take various other forms as well.

As shown, the measurement system 104 may be configured to communicate with the computing platform 110 over a respective communication path, which may generally comprise one or more data networks and/or data links of various forms. For instance, the respective communication path between the computing platform 110 and the measurement system 104 may include any one or more of a PAN, a LAN, a WAN such as the Internet or a cellular network, a cloud network, and/or a point-to-point data link, among other possibilities, where each such data network and/or link may be wireless, wired, or some combination thereof, and may carry data according to any of various different communication protocols. Additionally, the communication between the computing platform 110 and the measurement system 104 could be carried out via an API, among other possibilities. Additionally yet, although not shown, the respective communication path between the computing platform 110 and the measurement system 104 could also include one or more intermediate systems, examples of which may include a data aggregation system or a host server, among other possibilities. Many other configurations are also possible.

As further shown in FIG. 1, the environment 100 may include the client device 112 that is associated with an individual involved in managing and overseeing the health of the cocoa trees 102 and enables that individual to access and interact with the computing platform via a respective communication path. As with the client device 108, the client device 112 may generally include hardware components such as one or more processors, computer-readable mediums, communication interfaces, and I/O components (or interfaces for connecting thereto), among other possible hardware components, as well as software for carrying out the functionality disclosed herein related to accessing and interacting with the computing platform 110 (e.g., operating system software, web browser software, a mobile application, etc.). As representative examples, the client device 112 may take the form of a desktop computer, a laptop, a netbook, a tablet, a smartphone, or a PDA, among other possibilities.

The client device 112 may be configured to communicate with the computing platform 110 over a respective communication path, which may generally comprise one or more data networks and/or data links of various forms. For instance, the respective communication path between the client device 112 and the computing platform 110 may include any one or more of a PAN, a LAN, a WAN such as the Internet or a cellular network, a cloud network, and/or a point-to-point data link, among other possibilities, where each such data network and/or link may be wireless, wired, or some combination thereof, and may carry data according to any of various different communication protocols. Additionally, the communication between the client device 112 and the computing platform 110 could be carried out via an API, among other possibilities. Additionally yet, although not shown, the respective communication path between the client device 112 and the computing platform 110 could also include one or more intermediate systems, examples of which may include a data aggregation system or a host server, among other possibilities. Many other configurations are also possible.

Turning to FIG. 2, a diagram 200 is shown to illustrate one example of how a measurement system may be used to capture spectrometry data from leaves of a cocoa tree 210 in accordance with the present disclosure. As shown in FIG. 2, the diagram 200 includes the cocoa tree 210, a leaf 212 selected from the cocoa tree 210, an enlarged view 214 of a portion of the leaf 212, a spectrometer 220, a sample holder 222 for the spectrometer 220, a cover 224 for the spectrometer 220, and a client device 230.

Initially, one action to be taken for collecting spectrometry data from leaves of the cocoa tree 210 may be to select the leaves on which the spectrometer 220 will be used to take measurements. This leaf selection action may take several different factors into consideration, such as (but not limited to) leaf height, leaf age, visual characteristics that may indicate damage, leaf color, and leaf size. In accordance with the present disclosure, there are a number of approaches that may be applied for leaf selection based on these factors.

For instance, as noted above, one factor to consider may be the height of a given leaf within the canopy of the cocoa tree 210 (e.g., the distance between the given leaf and the ground in which the cocoa tree 210 is situated). One approach for selecting leaves based on height may involve selecting a similar number of leaves from each of a top third, a middle third 211, and a bottom third of the canopy of the cocoa tree 210. One advantage of this approach may be that sample statistics for leaves in the leaf sample (e.g., sample mean, sample median, and standard error) may be unbiased estimators of corresponding population parameters for leaves in the entire canopy (e.g., population mean, population median, and standard deviation, respectively). For instance, the average level of a given nutrient for leaves in the leaf sample may approximate the average level of the given nutrient for leaves across the entire canopy with a degree of accuracy that increases as the number of leaves in the leaf sample increases. In this example, a sample size of at least thirty leaves (e.g., ten leaves from each third of the canopy, respectively) may be sufficient to achieve a degree of accuracy that meets or exceeds a predefined threshold degree of accuracy (e.g., which may be defined by researchers beforehand). Another advantage of this approach is that it may allow nutrient levels for each third of the canopy to be evaluated separately, if desired, thereby allowing the health of the cocoa tree 210 as a whole to be assessed with both high accuracy and finer granularity. For instance, differences in the distributions of nutrient levels of leaves in different thirds of the canopy of the cocoa tree 210 may be measured and used (e.g., such as one of the AI models described further below with respect to FIG. 4) to determine one or more recommended actions to be taken in order to improve the health of the cocoa tree 210 (e.g., as described further below with respect to FIG. 4), such as actions that involve increasing or decreasing the extent to which the cocoa tree 210 is exposed to sunlight (e.g., planting shade trees near the cocoa tree 210 to reduce excessive sunlight exposure, removing shade trees near the cocoa tree 210 to increase sunlight exposure, etc.).

Another approach for selecting leaves based on height may involve selecting leaves from the top third of the canopy alone. One advantage of this approach may be that certain types of unmanned air vehicles (UAVs) may be used to collect the leaves. For example, the DeLeaves® tool (which comprises a drone equipped with a cutting mechanism and a small camera) is one type of UAV that may be used to collect leaves. The cutting mechanism of the Dealeaves® tool hangs below the drone such that leaves may be collected from the top third of the canopy while the rotors of the drone remain a safe distance above the cocoa tree 210, thereby preventing the rotors from striking the branches of the cocoa tree 210 during collection (which may be a risk if a UAV were to be used to collect leaves from the middle third 211 or the bottom third of the canopy). Also, if a UAV is used to collect the leaves, the cocoa tree 210 may be sampled even if the cocoa tree 210 is in a location that is difficult for researchers to access on foot and even if a user who controls the UAV remotely is a located a large distance (e.g., miles) away from the cocoa tree 210. Furthermore, if a UAV is used, researchers may avoid climbing the cocoa tree 210 to collect the leaves, thereby obviating the risk of falling and the risk of inadvertently damaging branches that may result if the researchers were to climb the cocoa tree 210 to collect the leaves. In this example, sample statistics for leaves in the leaf sample (e.g., sample mean and sample median) may be biased estimators of the corresponding population parameters for leaves in the entire canopy (e.g., population mean and population median, respectively). The bias may result because the average nutrient levels across the leaves in the sample may be higher than the average nutrient levels across the leaves in the entire canopy. For example, leaves that are located near the top (e.g., in the top third) of the canopy of the cocoa tree 210 may generally have higher levels of nutrients involved in photosynthesis (e.g., nitrogen and phosphorus) than leaves that are located in near the bottom of the canopy (e.g., in the bottom third). One reason for this difference in nutrient levels may be that leaves near the top are generally exposed to more sunlight than leaves near the bottom. In response to the increased exposure to sunlight, the leaves near the top may generate more chloroplasts to facilitate more photosynthesis and, as a result, may tend to have more chloroplasts per unit of leaf area than the leaves near the bottom. For this reason, if the approach of selecting leaves from the top third of the canopy alone is used, a respective bias for each nutrient level may be estimated beforehand (e.g., based on historical data that reflects nutrient level differences in leaves of cocoa trees based on height). For each given nutrient, the respective bias may be used in combination with the average level of the given nutrient across the leaves in the sample to derive a corrected estimator of the average level of the given nutrient across the leaves in the entire canopy. The corrected estimator may approximate the average level of the given nutrient for leaves across the entire canopy with a degree of accuracy that increases as the number of leaves in the leaf sample increases.

Yet another approach for selecting leaves based on height may involve selecting leaves from the bottom third of the canopy alone. One advantage of this approach may be that researchers may be able to collect leaves from the bottom third of the canopy without climbing the cocoa tree 210 or using equipment such as ladders or drones. In this way, researchers may avoid the risks of damaging tree branches due to climbing or falling from a ladder or from the cocoa tree 210. Furthermore, researchers may avoid the expense of purchasing and maintaining equipment such as drones and ladders and may avoid the labor involved in hauling such equipment to the cocoa tree 210. In this example, sample statistics for leaves in the leaf sample (e.g., sample mean and sample median) may be biased estimators of the corresponding population parameters for leaves in the entire canopy (e.g., population mean and population median, respectively). The bias may result because the average nutrient levels across the leaves in the sample may be lower than the average nutrient levels across the leaves in the entire canopy. For example, leaves that are located near the bottom (e.g., in the bottom third) of the canopy of the cocoa tree 210 may generally have lower levels of nutrients involved in photosynthesis (e.g., nitrogen and phosphorus) than leaves that are located in near the top of the canopy (e.g., in the top third). For this reason, if the approach of selecting leaves from the bottom third of the canopy alone is used, a respective bias for each nutrient level may be estimated beforehand (e.g., based on historical data that reflects nutrient level differences in leaves of cocoa trees based on height). For each given nutrient, the respective bias may be used in combination with the average level of the given nutrient across the leaves in the sample to derive a corrected estimator of the average level of the given nutrient across the leaves in the entire canopy. The corrected estimator may approximate the average level of the given nutrient for leaves across the entire canopy with a degree of accuracy that increases as the number of leaves in the leaf sample increases.

Still another approach for selecting leaves based on height may involve selecting leaves from the middle third 211 of the canopy alone. One advantage of this approach may be that sample statistics for leaves in the leaf sample (e.g., sample mean and sample median) may be unbiased estimators of the corresponding population parameters for leaves in the entire canopy (e.g., population mean and population median, respectively)—thereby obviating determination of a bias. However, the standard error for a given nutrient level for the leaf sample is likely to be smaller than the standard deviation for the given nutrient level for leaves across the entire canopy. This may be because leaves near the middle of the canopy (e.g., in the middle third 211) may tend to have nutrient levels that lie between the nutrient levels of the leaves near the top and the nutrient levels of the leaves near the bottom. For example, the upper-bound (e.g., maximum) level of a given nutrient for leaves found in the middle third 211 of the canopy may be less than the upper-bound level of the given nutrient for leaves in the top third of the canopy, while the lower-bound (e.g., minimum) level of the given nutrient for leaves found in the middle third 211 of the canopy may be greater than the lower-bound of the given nutrient for leaves in the bottom third of the canopy. Nevertheless, the resulting lower variance in nutrient levels of leaves found in the middle third 211 of the canopy may also be an advantage because the lower variance may allow a smaller sample size to be used to achieve a degree of accuracy that meets or exceeds a predefined threshold degree of accuracy (e.g., which may be defined by researchers beforehand). For instance, if each leaf in the sample is selected from the middle third 211, a sample size of four or five leaves may be sufficient. This smaller sample size may save time when the leaves in the sample are analyzed. For example, as will be explained further below, the spectrometer 220 may take multiple measurements on each leaf in the leaf sample. Depending on how many measurements are made on each leaf, the spectrometer 220 may take two minutes or more to collect the spectrometry data for a single leaf. A sample size of thirty leaves could therefore result in an hour of time spent collecting spectrometry data from the leaves in the leaf sample. If the sample size can be reduced to four or five leaves, the time spent collecting spectrometry data from the leaves in the leaf sample may be reduced by more than eighty percent.

As suggested by the approaches described above, the levels of certain nutrients in leaves may be correlated with leaf height. The approaches described above for selecting leaves based on height illustrate a few examples in accordance with the present disclosure, but other approaches based on leaf height may also be used. Furthermore, the approaches described above and/or other approaches for leaf selection based on leaf height may be used in combination with each other. As noted above, collecting leaves from multiple different heights (e.g., from each of the three thirds of the canopy of the cocoa tree 210) may allow differences in the distributions of nutrient levels of leaves in different thirds of the canopy of the cocoa tree 210 to be measured and used to determine recommended actions that involve increasing or decreasing the extent to which the cocoa tree 210 is exposed to sunlight. Without measurements of such differences, it may be more difficult for an AI model to determine whether to recommend any actions related to sunlight exposure.

In addition to leaf height, another factor to consider in leaf selection may be the age of a given leaf. One approach for selecting leaves based on leaf age may involve selecting leaves that are mature (e.g., leaves that are at least as old as a threshold age, such as a twenty-eight days old or some other threshold age that is based on the length of a flushing cycle for cocoa leaves). One advantage of this approach is that the nutrient levels of mature leaves may be in a relatively stable equilibrium such that the overall health of the cocoa tree 210 may be inferred reliably from those nutrient levels. This equilibrium may result because mature leaves are not passing through different stages of development that could cause nutrient levels to fluctuate naturally (thereby making it more difficult to draw inferences about the overall health of the cocoa tree 210 from the nutrient levels reliably). Newly sprouted leaves, for example, may be in an earlier developmental stage than that of mature leaves. In this earlier developmental stage, levels of nutrients associated with leaf growth may be elevated, while levels of other nutrients that are used less during this earlier developmental stage may be low. For this reason, nutrient levels in leaves that are not yet mature may be more representative of the health of the immature leaves in the cocoa tree 210 specifically than of the general health of the cocoa tree 210 overall.

Another approach for selecting leaves based on leaf age may involve selecting leaves that are at least as old as lower-bound threshold age (e.g., an age matching an average length of a flushing cycle for cocoa leaves), but are no older than an upper-bound threshold age (e.g., an age matching half of the average lifespan of a cocoa leaf or some other fraction of the average lifespan of a cocoa leaf). Like the previous approach, this approach may offer the advantage of avoiding the confounding effects of different developmental stages on nutrient levels. Furthermore, another advantage of this approach may be to avoid confounding effects that may result from excessive leaf age. For example, leaves that are excessively old may contain different levels of certain nutrients than those of mature leaves which are younger. Since cocoa trees are evergreen, cocoa leaves generally live for at least one year or more after reaching maturity. Nevertheless, older cocoa leaves do eventually die off (e.g., as oxidative damage accumulates and telomere erosion impedes the ability of leaf cells to replicate). Leaves that are near the end of their lives may have lower levels of nutrients associated with cell division, for example, and may therefore have nutrient levels that are less representative of the health of the cocoa tree 210 overall.

Another approach for selecting leaves based on leaf age may involve selecting leaves that are not fully mature (e.g., are younger than the threshold age). One advantage of this approach is that it may enable researchers to detect whether recent actions (e.g., fertilization, treatment, irrigation, etc.) to enhance the health of the cocoa tree 210 are benefiting leaves that are still developing. This may enable researchers to detect whether recent actions (e.g., actions that were taken at a past point in time that precedes a present point in time by less than the length of a flushing cycle) have been beneficial for leaf development specifically and/or for the health of the cocoa tree 210 by extension.

Yet another factor to consider in leaf selection may be visual characteristics that may indicate damage (e.g., from disease, pestilence, parasitic infection, exposure to excessive temperatures, or grazing done by animals). One approach for selecting leaves based on visual characteristics may involve selecting leaves that do not have such visible damage. One advantage of this approach is that it may allow researchers to determine nutrient levels that are more representative of the overall health of the cocoa tree 210 than the nutrient levels found in damaged leaves. For example, if leaf damage is localized to a relatively small part of the canopy and appears to be the result of infrequent animal grazing rather than an underlying infection or infestation, this approach may help researchers to avoid introducing bias caused by damage that is unlikely to represent a serious ongoing threat to the health of the cocoa tree 210.

On the other hand, another approach for selecting leaves based on visual characteristics may involve selecting leaves that do have visual damage. One advantage to this approach is that it may allow researchers to determine how an underlying pathology (infection or infestation) may be affecting nutrient levels in the leaves of the canopy and, by extension, the overall health of the cocoa tree 210. For example, a given leaf that is damaged may have elevated levels of nutrients involved in an immune response and/or a repair response triggered by the damage.

Still other factors to consider in leaf selection may be the color and/or the size of a given leaf. One approach for selecting leaves based on leaf color and/or leaf size may involve excluding leaves that are outliers in terms of leaf color and/or leaf size. One advantage to this approach may be that the sample may be more representative of the majority of leaves in the canopy (e.g., because bias from localized conditions that caused the excluded leaves to be outliers may be avoided). For example, the color of a leaf is generally correlated with the amount of chlorophyll and the number of chloroplasts per unit of leaf area. A condition such as a localized somatic mutation that that affects chlorophyll or carotenoids may affect the levels of nutrients involved in photosynthesis, thereby biasing the nutrient levels of a leaf in which the localized somatic mutation is present.

On the other hand, another approach for selecting leaves based on leaf color and/or leaf size may involve selecting leaves that are outliers in terms of leaf size and/or leaf color. One advantage of this approach is that it may help researchers identify how an underlying cause of an outlier leaf color and/or or an outlier leaf size influences nutrient levels in leaves and, by extension, the health of the cocoa tree 210.

The approaches described above for selecting leaves based on factors such as leaf height, leaf age, visual characteristics indicating damage, leaf color, and leaf size are intended as illustrative examples in accordance with the disclosure. These approaches and other approaches not explicitly described above (e.g., approaches based on factors not listed above) may be used individually or in combination with each other for purposes of leaf selection without departing from the spirit and scope of this disclosure.

Returning to FIG. 2, the leaf 212 is provided as an example illustration of how one of the leaves in the sample of leaves selected from the cocoa tree 210 may appear. Once the leaf 212 has been selected, one or more optional actions may be taken to prepare the leaf 212 before the spectrometer 220 takes any measurements on the leaf 212. Optional actions to prepare the leaf 212 may take any of various forms.

For example, one action may involve removing the leaf 212 from the cocoa tree 210 so that the leaf 212 can be transported to a location where the spectrometer 220 is to be used. If the spectrometer 220 is a portable unit (e.g., as shown), the leaf 212 may be removed so that a person operating the spectrometer 220 will not have to climb a ladder (or the cocoa tree 210 itself) to access the leaf 212 with the spectrometer 220. Alternatively, the leaf 212 may be left attached to the cocoa tree 210 (e.g., to avoid causing damage and/or stress to the cocoa tree 210) because the spectrometer 220 may be carried to the leaf 212. However, if the spectrometer 220 is a bench-top unit, the leaf 212 may have to be removed from the cocoa tree 210 so that the leaf 212 can be transported to a lab where the spectrometer 220 is located.

Another action to prepare the leaf 212 may involve cleansing the surface of the leaf 212 to remove dust or other foreign matter that might interfere with the measurements that the spectrometer 220 will take. For instance, the leaf 212 may be rinsed with water and/or wiped with a wet cloth. The leaf 212 may be dried (e.g., air dried or dried via a dry cloth) after the cleansing is complete. Optionally, a digital camera (e.g., in the client device 230) may be used to capture a digital photograph of the leaf 212 to document the appearance of the leaf 212. In addition, the leaf 212 may be stored in a receptacle (e.g., a bag or a jar) to prevent the surface of the leaf from being contaminated (e.g., during transportation to a site that differs from the site where the cocoa tree 210 is located). The receptacle may be labeled with an identifier for the cocoa tree 210 and/or an identifier for the leaf 212 (and/or an identifier for a leaf sample that includes the leaf 212) for recordkeeping purposes.

Another action may be to trim the leaf 212 down to a smaller size and/or a specific shape. One advantage of such trimming may be that the leaf 212 may fit properly into a particular receptacle or into the sample holder 222 after trimming when the cover 224 and the sample holder 222 are seated on the spectrometer 220. For instance, the leaf 212 may be trimmed down to the circular portion shown in the enlarged view 214 to fit into the sample holder 222. Alternatively, the leaf 212 may be left intact without performing any trimming (e.g., to avoid causing damage and/or stress to the cocoa tree 210 if the leaf 212 is left attached) because the spectrometer 220 may also be operated successfully without using the sample holder 222 or the cover 224.

Once the actions to prepare the leaf 212 have been completed, one or more points on the leaf 212 may be selected as target points from which the spectrometer 220 will take measurements. One approach for selecting one or more points on the leaf 212 may involve selecting a single point alone (e.g., on the adaxial side of the leaf 212). One advantage of this approach is that the time that the spectrometer 220 would have taken to make measurements on any additional target points may be saved.

Another approach for selecting one or more points on the leaf 212 may involve selecting multiple target points on the leaf 212 (e.g., on the adaxial side of the leaf 212). One advantage of this approach is that measurements made on the multiple target points may be averaged together to mitigate the effect of random measurement errors. Another advantage of this approach is that it reduces structural measurement errors that can result from the non-homogenous structure of leaves. For instance, nutrient levels in a primary vein of a leaf may differ from nutrient levels in a secondary vein (i.e., lateral vein) or from nutrient levels in a blade (i.e., lamina) of a leaf. Optionally, the multiple target points that are selected may be at least a threshold distance apart from each other to account for the natural variations in nutrient levels that may exist from one point to another across the leaf 212. This approach for selecting target points may take any of various forms.

As one possibility, the target points 216a-j shown in the enlarged view 214 provide one illustrative example of how ten target points may be spaced relative to one another. As shown, the target point 216a is located near the center of the enlarged view 214, while the target points 216b-j are evenly spaced along the perimeter of the enlarged view 214. Given that the enlarged view 214 shows a circular portion of the leaf 212, the distance between any pair of neighboring target points along the perimeter (e.g., target point 216b and target point 216c, target point 216c and target point 216d, etc.) may be approximated by a chord that connects the neighboring target points in the pair. In this example, the target points 216b-j have been selected such that the length of the respective chord between any given pair of neighboring target points is at least as large as a threshold distance. Furthermore, the distance between the target point 216a and any one of the target points 216b-j is also at least as large as the threshold distance.

As another possibility, target points may be selected according to a grid pattern such that the distance between any given pair of neighboring target points equals the distance between any other pair of neighboring target points.

As yet another possibility, target points may be randomly selected from a two-dimensional continuous uniform distribution (e.g., wherein a first dimension specifies a vertical coordinate and a second dimension specifies a horizontal coordinate) defined across the surface of the leaf 212. Each time a target point is selected, the domain of the two-dimensional continuous uniform distribution may be updated to exclude regions of the surface of the leaf 212 that lie within the threshold distance of any target points that have already been selected. As a result, any additional target points selected will not be within the threshold distance of any target points that have already been selected.

The approach for selecting target points may also take other forms.

Once the target points have been selected on the leaf 212, the spectrometer 220 may capture respective spectrometry data for each target point. Specifically, for each given target point, the spectrometer 220 may emit EMR within a spectrum of interest towards the given target point, measure the intensity of the EMR that is absorbed at the given target point at various wavelengths within the spectrum of interest, and then use the measured intensity to generate spectrometry data that indicates the absorbance of the leaf 212 at the given target point for the various wavelengths.

The example of FIG. 2 describes taking measurements directly on the leaf 212. However, nutrient levels may vary from leaf to leaf within the cocoa tree 210 and, in some instances, it may be impractical to use the spectrometer 220 to capture spectrometry data on a leaf-by-leaf basis for more than four or five leaves. One alternative strategy for collecting spectrometry data for the cocoa tree 210 may involve selecting a sample of leaves from the cocoa tree 210 (e.g., by considering the factors described above for leaf selection). In this example, the number of leaves in the sample may be large (e.g., thirty or more), but generally should not exceed a threshold fraction (e.g., one fourth) of the total number of leaves on the cocoa tree 210 to ensure that the cocoa tree 210 is not unduly stressed or damaged by the removal of the leaves in the sample.

Once the leaves in the sample ("the sample leaves") are removed, the sample leaves may be dried. Any of various methods may be used to dry the sample leaves. As one possibility, the sample leaves may be placed in a temperature-controlled environment (e.g., an oven) in which an elevated temperature (e.g., seventy degrees Celsius) is maintained. The sample leaves may remain in the temperature-controlled environment for a period of time (e.g., three days) to ensure that the sample leaves are sufficiently dried. As another possibility, the sample leaves may be placed in a low-pressure (e.g., five pounds per square inch or less) environment for a period of time to induce water to evaporate out of the sample leaves at an accelerated rate. Other methods may also be used to dry the sample leaves.

Once the sample leaves have been dried, the sample leaves may be converted to a powder form. Any of various methods may be used to convert the sample leaves into powder. As one possibility, the sample leaves may be crushed via a blender, a food processor, or some other tool and then passed through a sieve (e.g., a two-millimeter sieve) to obtain the powder. Note that use of a sieve or some other approach for ensuring that the particles in the powder are consistent may help ensure that calibration of the spectrometer 220 is accurate (e.g., because excessive variation in the size of particles in the powder may reduce the accuracy of calibration). Other methods may also be used to convert the dried sample leaves to powder.

Once the dried sample leaves have been converted into powder, some of the powder may be placed into the sample holder 222. Next, the sample holder 222 and the cover 224 may be seated on the spectrometer 220. The spectrometer 220 may then capture spectrometry data for the powder. Specifically, the spectrometer 220 may emit EMR within a spectrum of interest towards the powder, measure the intensity of the EMR that is absorbed by the powder at various wavelengths within the spectrum of interest, and then use the measured intensity to generate spectrometry data that indicates the absorbance of the powder for the various wavelengths.

One advantage of collecting spectrometry data from powder in this manner is that the number of measurements made by the spectrometer 220 may be greatly reduced as compared with the number of measurements that would be made on individual leaves. However, since the sample leaves are dried, this approach may be unsuitable for estimating water-related factors that may affect the health of the cocoa tree 210. Furthermore, this approach may not provide insight into how nutrient levels vary across individual leaves in the cocoa tree 210.

Once spectrometry data has been captured from leaves of a cocoa tree 210, the spectrometry data may be analyzed and plotted to facilitate making inferences about the health of the cocoa tree 210.

Figure 3:
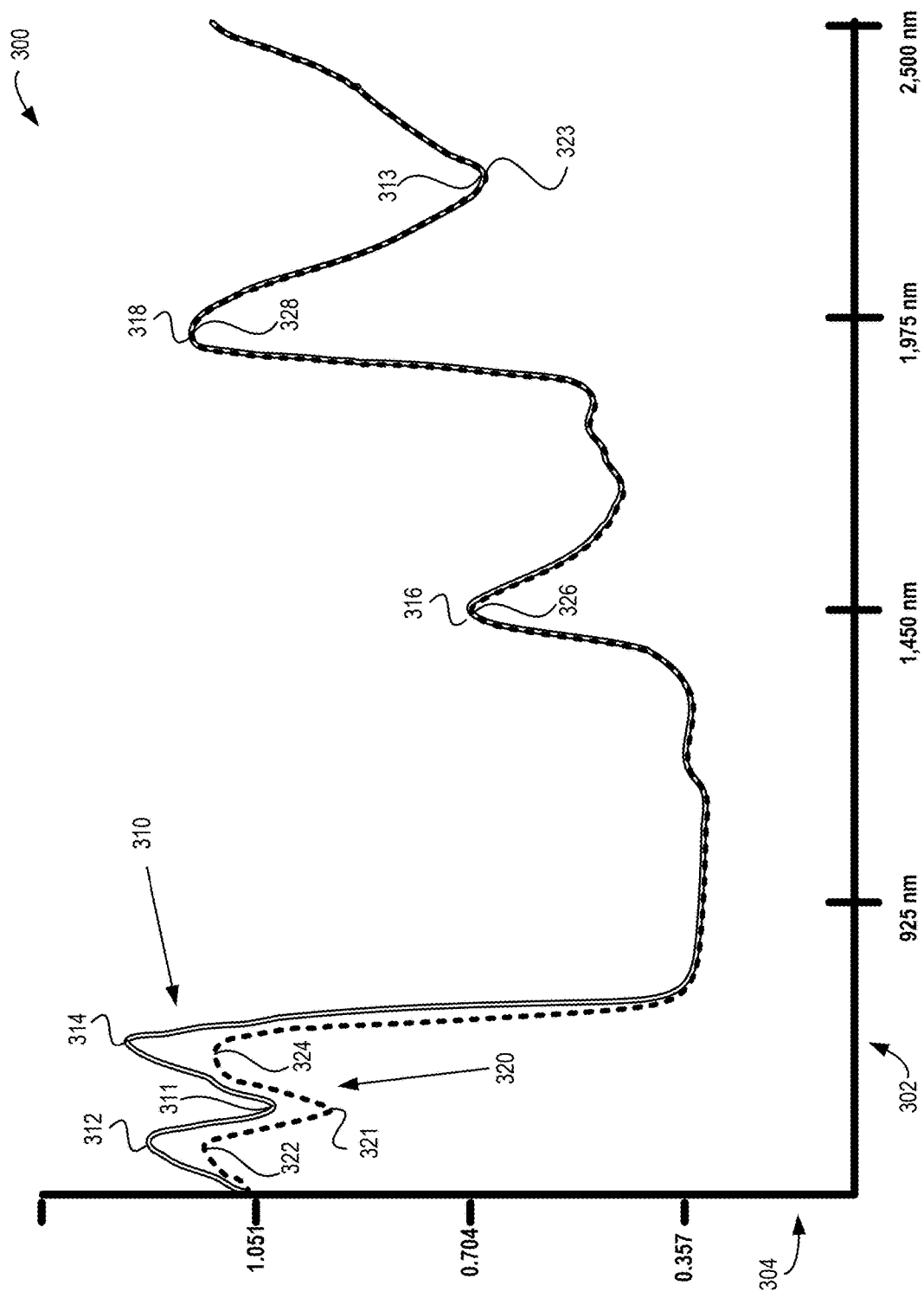
FIG. 3 depicts a plot 300 of example spectrometry data to illustrate how spectrometry data may distinguish healthy cocoa trees from cocoa trees that have insufficient levels of one or more nutrients, in accordance with the present disclosure.

Turning to FIG. 3, a plot 300 of example spectrometry data is shown to illustrate how spectrometry data may distinguish healthy cocoa trees from cocoa trees that have insufficient levels of one or more nutrients, in accordance with the present disclosure. The horizontal axis 302 of the plot 300 indicates wavelength (e.g., measured in nanometers (nm)), while the vertical axis 304 of the plot 300 indicates EMR absorbance (e.g., measured in Absorbance Units (AU)) on a logarithmic scale.

In this example, a spectrometer captured spectrometry data from a first leaf selected from a healthy cocoa tree by performing a series of measurements on the first leaf. For each measurement in the series, the spectrometer emitted EMR of a respective wavelength found within the range shown on the horizontal axis 302 and measured the absorbance of the first leaf at the respective wavelength. A first curve 310 represents the measured absorbance of the first leaf plotted against the respective wavelengths of EMR emitted by the spectrometer. Note that if measurements were performed on multiple target points on the first leaf, the absorbance values indicated by the first curve 310 may be averages of measurements taken on the multiple target points. For this reason, the first curve 310 may have been generated via a regression technique (e.g., polynomial regression) or an interpolation technique (e.g., cubic spline).

Furthermore, in this example, the spectrometer captured spectrometry data from a second leaf selected from an unhealthy cocoa tree by performing a series of measurements in the same manner as described above for the first leaf. A second curve 320 represents the measured absorbance of the second leaf plotted against the wavelengths of EMR emitted by the spectrometer and may have been generated via a regression technique or an interpolation technique.

As shown, the shape of the first curve 310 and the shape of the second curve 320 are similar. For instance, the first curve 310 and the second curve 320 increase (e.g., have positive first derivatives of absorbance with respect to wavelength, which may be denoted by $\partial A/\partial \lambda$) over matching ranges of wavelength values and decrease (e.g., have negative first derivatives of absorbance with respect to wavelength) over matching ranges of wavelength values. Furthermore, the first curve 310 and the second curve 320 are concave up (e.g., have positive second derivatives of absorbance with respect to wavelength, which may be denoted by $\partial^2 A/\partial \lambda^2$) over matching ranges of wavelength values and are concave down (e.g., have negative second derivatives of absorbance with respect to wavelength) over matching ranges of wavelength values. Further still, the first curve 310 and the second curve 320 have local extrema (e.g., local maxima or local minima) at matching wavelength values. For instance, the first curve 310 includes a peak 312 at approximately 418 nm, a peak 314 at approximately 723 nm, a peak 316 at approximately 1,450 nm, and a peak 318 at approximately 1887 nm. In addition, the first curve 310 includes a local minimum 311 at approximately 625 nm and a local minimum 313 at approximately 2,200 nm. The second curve 320 also includes local maxima and local minima at wavelengths that match the wavelengths at which local maxima and local minima are found in the first curve 310, respectively. Specifically, the second curve 320 includes a peak 322 at approximately 418 nm, a peak 324 at approximately 723 nm, a peak 326 at approximately 1,450 nm, and a peak 328 at approximately 1887 nm and further includes a local minimum 321 at approximately 625 nm and a local minimum 323 at approximately 2,200 nm. Further yet, over several ranges of wavelength values, the first curve 310 and the second curve 320 indicate absorbance values that appear to be identical (at least within the margin of measurement error for the spectrometer that collected the spectrometry data). The many similarities between the first curve 310 and the second curve 320 may result from the tested samples—namely, the first leaf and the second leaf—being the same type of physical matter (i.e., cocoa leaves).

However, for a few ranges of wavelength values, the first curve 310 and the second curve 320 indicate absorbance values that are visibly different. Some of the different absorbance values occur in ranges of wavelength values that include local extrema. For example, at 418 nm, the peak 322 is lower than the peak 312. Furthermore, at 2,200 nm, the local minimum 323 is lower than the local minimum 313.

At least some of these differences between the first curve 310 and the second curve 320 may result from differences in the levels of certain nutrients found in the first leaf and the second leaf, respectively. In particular, several local extrema may be correlated with levels of several respective nutrients. For instance, the local extrema that occur at approximately 723 nm (i.e., the peak 314 and the peak 324) may be correlated with nitrogen levels. Specifically, a higher peak at approximately 723 nm may indicate a higher level of nitrogen, while a lower peak may indicate a lower level of nitrogen (e.g., the absorbance value at a peak at approximately 723 nm may be positively correlated with the level of nitrogen in the sample corresponding to a curve of absorbance values). Therefore, the level of nitrogen in the first leaf may be greater than the level of nitrogen in the second leaf because the peak 312 is higher than the peak 322. Similarly, the local extrema that occur at approximately 418 nm may be positively correlated with phosphorus levels. Therefore, the level of phosphorus in the first leaf may be greater than the level of phosphorus in the second leaf because the peak 314 is higher than the peak 324. In addition, the local extrema that occur at approximately at approximately 1887 nm may be correlated (e.g., positively) with water levels.

While certain nutrients may be correlated with local extrema that occur at respective single wavelength values, other nutrients may be correlated with differences that exist in ranges of wavelengths that do not include extrema. Furthermore, some nutrients may be correlated with respective combinations of differences that occur in different ranges of wavelengths. Identifying correlations between nutrients and such combinations of differences is generally not a trivial task. However, as will be described below with respect to FIG. 4, such correlations can be identified via a trained machine-learning model that may be included in a predictive analytics pipeline.

Figure 4:
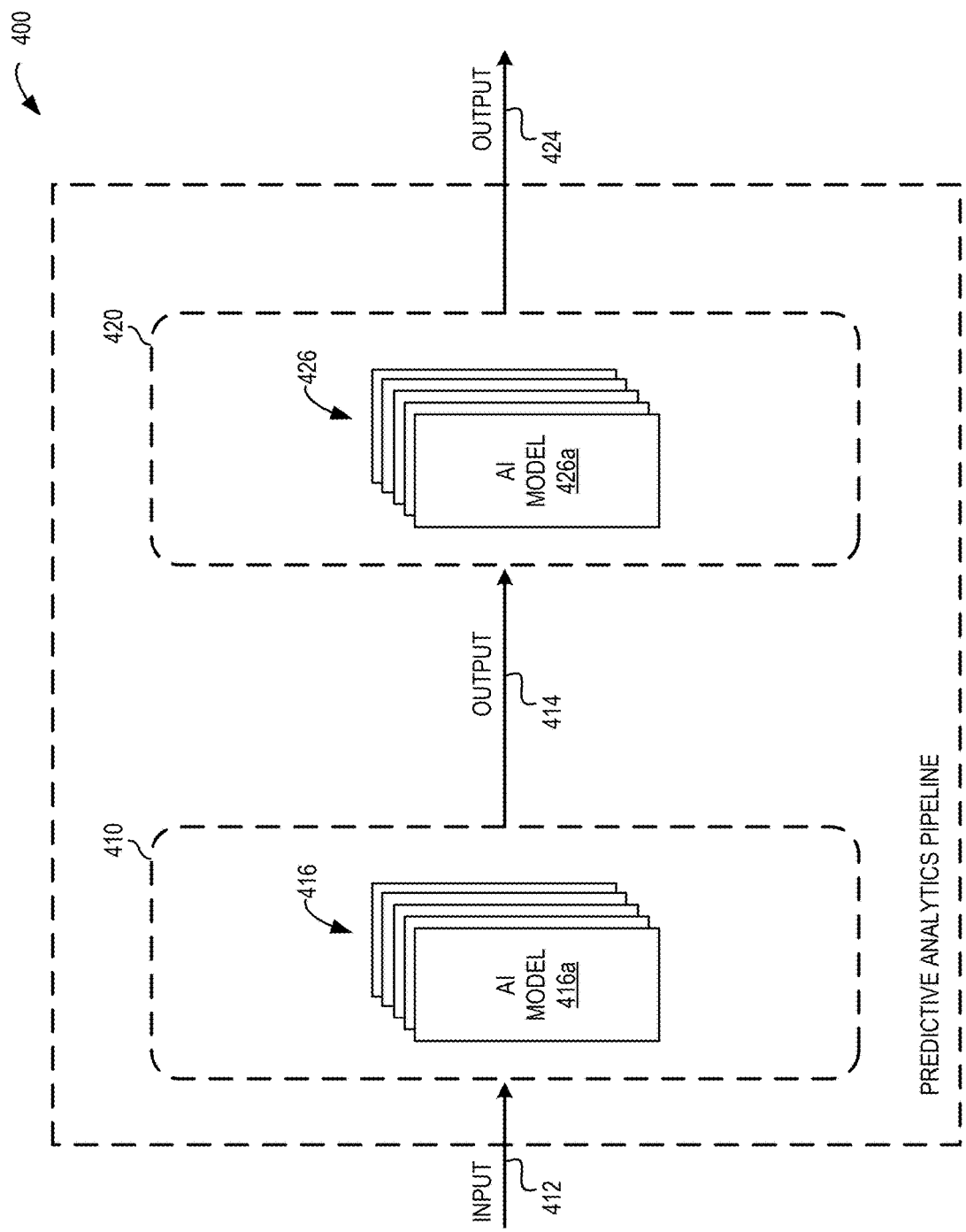
FIG. 4 depicts a conceptual illustration of a predictive analytics pipeline for (i) predicting one or more nutrient levels (e.g., nitrogen, phosphorus, potassium, and/or water) of a cocoa tree and (ii) generating and outputting one or more recommendations for treating the cocoa tree based on the predicted one or more nutrient levels in accordance with the present disclosure.

Turning now to FIG. 4, a conceptual illustration of a predictive analytics pipeline 400 for (i) predicting one or more nutrient levels (e.g., nitrogen, phosphorus, potassium, and/or water) of a cocoa tree and (ii) generating and outputting one or more recommendations for treating the cocoa tree based on the predicted one or more nutrient levels is shown in accordance with the present disclosure. The predictive analytics pipeline 400 may be implemented by, for example, a computing platform such as the computing platform 110 shown in FIG. 1. As shown in FIG. 4, the predictive analytics pipeline 400 may comprise a first model stage 410 that is configured to predict one or more nutrient levels of a given cocoa tree based on spectrometry data and a second model stage 420 that is configured to generate one or more recommendations for treating the given cocoa tree.

At a high level, the first model stage 410 may comprise one or more AI models 416 that are configured to receive an input 412 and produce an output 414. Each of these aspects of the first model stage 410 may take any of various forms.

To begin, the input 412 of the first model stage 410 may comprise spectrometry data collected by a measurement system (e.g., as described above with respect to FIG. 1) for a given leaf sample, which may comprise one or more leaves selected from the given cocoa tree under evaluation. In line with the discussion above, this spectrometry data may take any of various forms. For example, as described above with respect to FIGS. 1-3, the spectrometry data collected from a given leaf included in a leaf sample (e.g., a leaf sample that is selected in the manner described above) may include measurements of EMR absorbance of the given leaf at one or more wavelengths of EMR at one or more target points on the given leaf. If such measurements were made at more than one wavelength, increments between the wavelengths may match a predefined increment value (e.g., 1 nm or another increment value measured in nanometers). The spectrometry data may also take other forms. The input 412 of the first model stage 410 could include other types of data as well.

The spectrometry data collected by a measurement system may also be pre-processed by the predictive analytics pipeline 400 before being provided as input to the one or more AI models 416. This pre-processing may take any of various forms, including applying scatter correction and/or spectral derivatives, normalizing measurement values, rounding and/or truncation decimal values, detecting and treating outlier values (e.g., via techniques such as capping, binning, Winsorization, etc.), converting measurements from one unit type to another unit type, averaging multiple (e.g., redundant) measurements that were made on a single target point based on a single wavelength to determine an average measurement value, adding or removing whitespace or other types of characters, converting textual characters from one encoding format to another encoding format, etc. The pre-processing may also take other forms.

Further, the output 414 of the first model stage 410 may comprise a prediction of a respective nutrient level for each of one or more types of nutrients of the given cocoa tree. For example, in accordance with the present disclosure, the output 414 of the first model stage 410 may comprise a prediction of a respective nutrient level for any one or more of nitrogen, phosphorus, potassium, and/or water, among other possible types of nutrients that could be predicted.

Further yet, the one or more AI models 416 may each take the form of any type of AI model that is configured to predict a level of a respective type of nutrient of a cocoa tree based on spectrometry data for the cocoa tree. In this respect, if the first model stage 410 is designed to predict a single nutrient level, then the one or more AI models 416 may comprise a single AI model, whereas if the first model stage 410 is designed to predict multiple nutrient levels, then the one or more AI models 416 may comprise multiple AI models. For instance, if the first model stage 410 is designed to predict a level of each of nitrogen, phosphorus, potassium, and/or water, then one of the AI models 416 may be configured to predict a level of nitrogen, another one of the AI models 416 may be configured to predict a level of phosphorus, yet another one of the AI models 416 may be configured to predict a level of potassium, and yet another one of the AI models 416 may be configured to predict a level of water content. Other configurations of the one or more AI models 416 are possible as well. Each of the one or more AI models 416 may take any of various forms, which will be described below in the context of a first example AI model 416a.

As one possibility, the example AI model 416a may be a machine-learning model, which could take any of various forms—including but not limited to a decision-tree model (e.g., a Random Forest model, a CatBoost model, a gradient-boosted decision tree (GBDT) model, etc.), a neural-network model (e.g., a feed-forward neural network or a recurrent neural network trained via backpropagation, a deep-belief network with layers that comprise restricted Boltzmann machines trained via contrastive divergence, Kullback-Leibler divergence, etc.), a regression model (e.g., a model based on Lasso regression, logistic regression, linear regression, polynomial regression, etc.), a nearest-neighbor model (e.g., k-nearest neighbor, BallTree, KDTree, etc.), a support vector machine (SVM) model, and/or a Bayesian model (e.g., a Bayesian belief network), among other possibilities.

If the AI model 416a is a machine-learning model, the AI model 416a may be trained by applying a machine-learning process to a set of training data. The specific machine-learning process to apply will depend on the specific type of machine-leaning model that the AI model 416a is. As some illustrative examples, backpropagation could be used to train a feed-forward neural network, regression could be used to train a regression model, and an SVM process could be used to train an SVM model, among other possibilities. (Note that a nearest-neighbor model may be configured to retain the training data as part of the nearest-neighbor model itself without being trained in any other sense.)

Further, the set of training data for the machine-learning model may take any of various forms. As one possible implementation, the set of training data may comprise a collection of training instances that conform to a schema. The schema may specify feature variables (i.e., formal parameters) such that each feature variable identifies one respective type of spectrometry data variable the AI model 416a is configured to receive as input. For instance, one feature variable may specify that the AI model 416a is configured to receive an EMR absorbance value for a first wavelength, while another feature variable may specify that the AI model 416a is configured to receive an EMR absorbance value for a second wavelength, and so on. In one example, the schema may include a respective feature variable for each wavelength in a spectrum of interest. In another example, the schema may include respective feature variables for a subset of the wavelengths in the spectrum of interest. This may be desirable (e.g., to avoid overfitting) in instances where the absorbance values of some wavelengths in the spectrum of interest are not appreciably correlated with the level of nutrient that the AI model 416a is configured to predict.

In addition to the feature variables, the schema may specify a label type for each training instance, which may depend on the intended output of the AI model 416a. In particular, the label type for the AI model 416a may indicate the specific type of nutrient level that is to be predicted by the AI model 416a. For instance, the schema may indicate a level of nitrogen, phosphorus, potassium, or water, among other possibilities.

Optionally, the schema may also indicate the respective units for each feature variable (e.g., AU, lumens, etc.) and for the nutrient level indicated by the label type (e.g., nanograms per millimeter squared or some other unit of amount per unit of area, nanograms per gram or some other unit of mass per a larger unit of mass, etc.). Furthermore, as another option, the schema may indicate a respective format (e.g., a numeric format such as integer, decimal, or fraction or a categorical format) for each feature variable and for the label type. In addition, as another option, the schema may specify a respective possible range of values for each feature variable and for the label type.

Once the schema has been defined, the collection of training instances may be compiled. Each given training instance may represent a respective historical leaf sample from a respective cocoa tree (e.g., a leaf sample that is selected in the manner described above). For each given feature variable (i.e., formal parameter) specified by the schema, the given training instance may include a corresponding feature value (i.e., actual parameter). For instance, as one illustrative example, consider a scenario in which the given feature variable specifies that the AI model 416a is configured to receive an EMR absorbance value for a wavelength of 418 nm. In this example, the corresponding feature value that maps to the given feature variable in the given training instance may be a numeric absorbance value (e.g., 1.25 AU) that indicates a value that a spectrometer measured on the historical leaf sample. (In this example, also note that a placeholder value such as "unknown" or "?" could be included as the corresponding feature value if the spectrometer did not make any measurements at 418 nm.) In addition to the feature values, the given training instance may include a corresponding label value for the label type specified by the schema. The label value indicates the actual nutrient level in the given historical leaf sample, and serves as ground truth for the nutrient level corresponding to the feature values included in the given training instance.

In practice, the training instance data may be collected in any of various manners. As one possibility, the spectrometry values for the reference leaf samples may be collected in a similar manner to how the values of the spectrometry data variables are to be collected once the AI models are deployed, which may involve the use of the type of measurement equipment described above to capture spectrometry data. And in turn, the label values indicating the actual nutrient levels of the reference leaf samples may be collected using any technique now known or later developed for capturing accurate measurements of nutrient levels in leaf samples (e.g., an acetylene reduction assay (ARA) or Kjeldahl digestion). In this respect, the techniques described above for selecting the leaf samples to be evaluated after the AI models are deployed may similarly be utilized to select the leaf samples to be used for training. Other approaches for collecting the training instance data may be utilized as well.

During the training, the machine-learning process may utilize the training instances to train a machine-learning model that is configured to predict a nutrient level based on spectrometry data, which may involve determining a set of model parameters for the AI model 416a that best aligns the predicted nutrient levels output by the AI model 416a for the training instances with the labels for the training instances. Depending on the type of machine-learning process used to train the AI model 416a, the manner in which the determination of the model parameters is made may take any of various forms, and may involve iterative adjustments to the model parameters that are carried out during the course of the process.

Furthermore, the machine-learning process may divide the training instances into a training subset and a validation subset such that the training subset is used to train the AI model 416a and the validation subset is used to assessment the accuracy of the AI model 416a after the AI model 416a is trained on the training subset. The training subset may include a first percentage of the training instances (e.g., eighty percent), while the validation subset may include a remainder percentage of the training instances (e.g., twenty percent if the first percentage is eighty percent). The accuracy of the AI model 416a may be measured by one or more metrics (e.g., Root Mean Squared Error (RMSE), Mean Absolute Error (MAE), Precision, Recall, Specificity, F-1 Score, etc.)

Utilizing a training subset and a validation subset in this manner may enable the machine-learning process to detect whether one or more model parameters should be adjusted to increase the accuracy of the AI model 416a. For instance, if a difference in the prediction accuracy the AI model 416a achieves for the training subset and the prediction accuracy the AI model 416a achieves for the validation subset exceeds a threshold, the machine-learning process may detect that model parameters should be adjusted to reduce overfitting. Such adjustments will depend on the types of machine-learning model(s) included in the AI model 416a. For example, if the AI model 416a comprises a neural network, the training process may reduce a number of epochs used to train the AI model 416a on the training data. If the AI model 416a comprises a decision-tree model, the machine-learning process may apply one or more pruning techniques to one or more decision trees in the AI model 416a. Other types of machine-learning models and other approaches to reduce overfitting may be used. This may lead to a more accurate assessment of how well the AI model 416a is likely to perform when predicting nutrient levels based on spectrometry data that is not part of the training data.

The machine-learning process may perform several iterations of dividing the training instances into a training subset and a validation subset, retraining the AI model 416a, and adjusting model parameters accordingly (e.g., via cross validation). In each iteration, a respective training subset and a respective validation subset (which are disjoint subsets of the training instances) may be selected in a manner (e.g., randomly) such that no two iterations use the same training subset and validation subset.

After a designated number of iterations have been performed, the machine-learning process may retrain the AI model 416a on the full set of training instances using the model parameters that were adjusted as a result of the iterations (e.g., parameters associated with overfitting). In addition, the machine-learning process may test the AI model 416a on a test set of instances (e.g., that is kept separate from the full set of training instances) to measure the accuracy of the AI model 416a after the AI model 416a has been retrained on the full set of machine-learning instances.

An AI model 416a comprising a machine-learning model could take other forms as well.

As another possibility, the AI model 416a may be a rule-based model that is configured to predict a level of a given type of nutrient. Such a rule-based model may generally comprise a model that encodes a set of rules, where each rule in the rule-based model may specify one or more conditions and a prediction value (e.g., a predicted nutrient level) to be output when the one or more conditions are satisfied. Optionally, if the rules in the set are defined in such a way that the respective one or more conditions for more than one rule may be satisfied concurrently, the rule-based model may include an order of precedence that specifies which of the rules whose respective one or more conditions are satisfied will apply.

The rule-based model may take various forms and may be generated in different ways. For example, the rule-based model may comprise a collection of user-defined rules that are defined by a user (e.g., by entering rule data through a user interface). In another example, the rule-based model may be an association-rule model that is generated by applying an association-rule training technique such as Frequent Pattern Growth (FP-Growth), Equivalence Class Transformation (Eclat), Apriori, or some other training technique for generating association rules. In yet another example, the rule-based model may be a hybrid model that includes both association rules generated via training and user-defined rules defined based on user input.

An AI model 416a comprising a rule-based model may also take other forms.

The input 412, output 414, and one or more AI models 416 of the first model stage 410 may take various other forms as well.

Turning to the second model stage 420, at a high level, the second model stage 420 may comprise one or more AI models 426 that are configured to receive the output 414 of the first model stage 410 as input and then produce an output 424. Each of these aspects of the second model stage 420 may take any of various forms.

To begin, the input of the second model stage 420 includes the output 414 of the first model stage 410, which as noted above comprises a prediction of a respective nutrient level for each of the one or more types of nutrients of the given cocoa tree. For example, the input of the second model stage 420 may include a respective predicted level of one or more of nitrogen, phosphorus, potassium, and/or water. Additionally, the input of the second model stage 420 could include other types of data as well.

The output 414 of the first model stage 410 may also be pre-processed by the predictive analytics pipeline 400 before being provided as input to the one or more AI models 426. This pre-processing may take any of various forms, including normalizing nutrient levels, rounding and/or truncation decimal values, detecting and treating outlier nutrient levels (e.g., via techniques such as capping, binning, Winsorization, etc.), converting nutrient levels from one unit type to another unit type, adding or removing whitespace or other types of characters, converting textual characters from one encoding format to another encoding format, etc. The pre-processing may also take other forms.

Further, the output 424 of the second model stage 420 may comprise one or more recommendations for treating the given cocoa tree under evaluation, such as recommended actions to be taken in order to improve the health of the given cocoa tree. The one or more recommendations may take any of various forms or combinations thereof.

As one possibility, the one or more recommendations included in the output 424 may include a recommendation related to fertilization for the given cocoa tree. For example, a recommendation related to fertilization may include a suggestion of whether one or more fertilizers should be applied, how much of each of the one or more fertilizers should be applied, a form in which each of the one or more fertilizers should be applied (e.g., in solid or liquid form), a frequency with which the one or more fertilizers should be applied, which ingredients to include in the one or more fertilizers to be applied, and/or one or more suggested ratios of the ingredients to one another, among other possibilities.

As another possibility, the one or more recommendations included in the output 424 may include a recommendation related to treatments for disease (e.g., whether specific fungicides, pesticides, phages, salicylic acid, antibiotics, etc. should be applied, among other possibilities).

As yet another possibility, the one or more recommendations included in the output 424 may include a recommendation related to irrigation. For example, a recommendation related to irrigation may include a suggestion of whether any water should be supplied via irrigation (e.g., as opposed to supplied naturally via precipitation such as rainfall), one or more forms in which water should be supplied (e.g., via sprinklers, drip irrigation, etc.), a frequency at which water should be supplied (e.g., hourly, daily, weekly, monthly, bimonthly, etc.), an amount of water to provide each time water is supplied (e.g., in liters, gallons, etc.), a time of day in which water should be supplied, a range of acceptable temperatures at which water should be when applied, and/or a location where water should be supplied relative to the given cocoa tree (e.g., at a radius of a certain distance from the center of the tree trunk, etc.), among other possibilities.

As yet another possibility, the one or more recommendations included in the output 424 may include a recommendation related to changing an extent to which the given cocoa tree or a part thereof (e.g., a particular third of the canopy of the given cocoa tree) is exposed to sunlight. For example, a recommendation related to changing an extent to which the given cocoa tree (or a part thereof) is exposed to sunlight may include a suggestion to position a shade source (e.g., plant a shade tree), a recommended height range for a shade source to be positioned, a recommended range for a distance away from the given cocoa tree at which a shade source should be positioned, a recommended direction at which a shade source should be positioned relative to the given cocoa tree (e.g., a bearing angle for a compass positioned at the base of the given cocoa tree), a suggestion to prune a higher portion (e.g., a top third) of the canopy of the given cocoa tree to increase the exposure of a lower portion (e.g., middle third and/or bottom third) of the canopy to sunlight, a suggestion to remove a shade source, a suggestion to modify a shade source (e.g., prune a shade tree down to a specific height), and/or a suggestion to remove a shade source that is located within a certain distance of the given cocoa tree, among other possibilities.

The one or more recommendations included in the output 424 may take other forms as well.

Further yet, the one or more AI models 426 may each take the form of any type of AI model that is configured to generate and output a recommendation for treating a cocoa tree. For instance, such an AI model may be configured to predict whether taking a given type of action is advisable based on the predicted nutrient level(s) of the given cocoa tree (e.g., whether the given type of action is likely to enhance cocoa tree health) and then recommend the given type of action if it is determined to be advisable (e.g., meet a threshold likelihood value). In this respect, if the second model stage 420 is designed to output a single type of recommendation, then the one or more AI models 426 may comprise a single AI model, whereas if the second model stage 420 is designed to output multiple types of recommendations, then the one or more AI models 426 may comprise multiple AI models.

To illustrate with some representative examples, the AI models 426 may include any or more of (i) an AI model that is configured to recommend whether to provide a fertilizer that contains a nitrogen source (e.g., nitrate) to the given cocoa tree, (ii) an AI model that is configured to recommend whether to provide a fertilizer that contains a phosphorus source to the given cocoa tree, (iii) an AI model that is configured to recommend whether to provide a fertilizer that contains a potassium source to the given cocoa tree, among other possibilities, (iv) an AI model that is configured to recommend how whether to supply water to the given cocoa tree via irrigation, and/or (v) an AI model that is configured to recommend whether a particular disease treatment should be provided to the given cocoa tree, among many other possibilities.

Each of the one or more AI models 426 may take any of various forms, which will be described below in the context of a first example AI model 426*a*.

As one possibility, the AI model 426*a* may be a machine-learning model, which could take any of various forms—including but not limited to a decision-tree model (e.g., a Random Forest model, a CatBoost model, a GBDT model, etc.), a neural-network model (e.g., a feed-forward neural network or a recurrent neural network trained via back-propagation, a deep-belief network with layers that comprise restricted Boltzmann machines trained via contrastive divergence, Kullback-Leibler divergence, etc.), a regression model (e.g., a model based on Lasso regression, logistic regression, linear regression, polynomial regression, etc.), a nearest-neighbor model (e.g., k-nearest neighbor, BallTree, KDTree, etc.), an SVM model, and/or a Bayesian model (e.g., a Bayesian belief network), among other possibilities.

Like the AI model 416*a* of the first model stage 410, if the AI model 426*a* is a machine-learning model, the AI model 426*a* may be trained by applying a machine-learning process to a set of training data. The specific process to apply will depend on the specific type of machine-leaning model that the AI model 426*a* is. As some illustrative examples, back-propagation could be used to train a feed-forward neural network, regression could be used to train a regression model, and an SVM process could be used to train an SVM model, among other possibilities. (Again, note that a nearest-neighbor model may be configured to retain the training data as part of the nearest-neighbor model itself without being trained in any other sense.)

Further, the set of training data for the machine-learning model may take any of various forms. As one possible implementation, the set of training data may comprise a collection of training instances that conform to a schema. The schema may specify feature variables (i.e., formal parameters) such that each feature variable identifies one respective type of data variable the AI model 426*a* is configured to receive as input. For instance, one feature variable may specify that the AI model 426*a* is configured to receive a level of a first nutrient, while another feature variable may specify that the AI model 426*a* is configured to receive a level of a second nutrient, and so on (among other possible types of feature variables). In one example, the schema may include a respective feature variable for each nutrient specified by the predicted nutrient levels found in the output 414 of the first model stage 410 (which the second model stage 420 receives as input). In another example, the schema may include a subset of the nutrients indicated by the output 414 of the first model stage 410 (e.g., one or more particular nutrient levels). This may be desirable (e.g., to avoid overfitting) in instances where the some of the predicted nutrient levels are not appreciably correlated with the particular type of recommendation that the AI model 426*a* is configured to generate.

In addition to the feature variables, the schema may specify a label type for the training instance. The label type indicates some aspect of the historical treatment of the reference cocoa tree that corresponds to the type of recommendation to be made by the AI model 426*a*. For instance, the schema may indicate some aspect of the fertilization history of the reference cocoa tree (e.g., whether and to what extent the reference cocoa tree was fertilized), the disease treatment history of the reference cocoa tree (e.g., whether and to what extent the reference cocoa tree received disease treatment), and/or the irrigation history of the reference cocoa tree (e.g., whether and to what extent the reference cocoa tree was irrigated), which may correspond to the type of recommendation to be made by the AI model 426*a*.

Optionally, the schema may also indicate a respective unit for each feature variable and, where applicable, for quantities related to types of actions that the AI model 426*a* has the capacity to recommend (e.g., quantities of water to use for irrigation, quantities of fertilizer to apply, etc.). Furthermore, as another option, the schema may indicate a respective format (e.g., a numeric format such as integer, decimal, or fraction or a categorical format) for each feature variable and, where applicable, for quantities related to types of actions that the AI model 426*a* has the capacity to recommend. In addition, as another option, the schema may specify a respective possible range of values for each feature variable and, where applicable, for quantities related to types of recommendations that the AI model 426*a* is configured to output.

Once the schema has been defined, the collection of training instances for training the AI model 426*a* may be compiled. Each given training instance may represent a respective historical leaf sample from a respective cocoa tree. For each given feature variable (i.e., formal parameter) specified by the schema, the given training instance may include a corresponding feature value (i.e., actual parameter). For instance, as one illustrative example, consider a scenario in which the given feature variable specifies that the AI model 426*a* is configured to receive a nitrogen level. In this example, the corresponding feature value that maps to the given feature variable in the given training instance may be a number of milligrams per gram for nitrogen for the respective leaf sample to which the training instance maps. (In this illustrative example, also note that a placeholder value such as "unknown" or "?" could be included as the corresponding feature value if no predicted value or known value for the predicted nitrogen level was provided for the leaf sample.) In addition to the one or more feature values, the given training instance may include a corresponding label value that specifies some aspect of the historical treatment of the reference cocoa tree that corresponds to the type of recommendation to be made by the AI model 426*a*. This label value serves as ground truth for the recommendation corresponding to the one or more nutrient levels included in the given training instance, and may take any of various forms.

As one possibility, if the AI model 426*a* is configured to recommend whether or not to take a given type of action—such as whether or not to add a given type of fertilizer, whether or not to engage in a given type of disease treatment, or whether or not to perform irrigation-then the label value may take the form of a binary indicator of whether or not the given type of action was performed for the respective cocoa tree that is the subject of the training instance (e.g., 0 if the given type of action was not performed and 1 if the given type of action was performed). As another possibility, if the AI model 426*a* is configured to recommend an extent to which a given type of action is to be performed-such as an amount of a given type of fertilizer, an amount of a given type of disease treatment, or an amount of irrigation to be applied—then the label value may take the form of a numeric or categorical quantification of the extent to which given type of action was performed for the respective cocoa tree that is the subject of the training instance. Depending on the type of recommendation to be made by the AI model 426a, the label value may take various other forms as well.

In practice, the training instance data may be collected in any of various manners. As one possibility, the one or more nutrient levels of the reference leaf samples may be collected using any technique now known or later developed for capturing accurate measurements of nutrient levels in leaf samples (e.g., an ASA or Kjeldahl digestion). In this respect, the nutrient levels used as training data for the feature variables of AI model 426a may either be the same as or different from the nutrient levels used as training data for the labels of AI model 416a. And in turn, the label values indicating some aspect of the historical treatment of the reference cocoa trees may be determined based on available information regarding the historical treatment activity for the reference cocoa trees, which may be embodied in the form of data that is stored at or otherwise accessible to the computing platform 110. Other approaches for collecting the training instance data may be utilized as well.

During the training, the machine-learning process may utilize the training instances to train a machine-learning model that is configured to generate and output a recommendation based on one or more nutrient levels, which may involve determining a set of model parameters for the AI model 426a that best aligns the recommendations output by the AI model 426a for the training instances with the labels for the training instances (e.g. the historical treatment activity for the reference cocoa trees). Depending on the type of machine-learning process used to train the AI model 426a, the manner in which the determination of the model parameters is made may take any of various forms, and may involve iterative adjustments to the model parameters that are carried out during the course of the process.

An AI model 426a comprising a machine-learning model could take other forms as well.

As another possibility, the AI model 426a may be a rule-based model that is configured to generate recommendations. Such a rule-based model may generally comprise a model that encodes a set of rules, where each rule in the rule-based model may specify one or more conditions and a recommendation value to be output when the one or more conditions are satisfied. Optionally, if the rules in the set are defined in such a way that the respective one or more conditions for more than one rule may be satisfied concurrently, the rule-based model may include an order of precedence that specifies which of the rules whose respective one or more conditions are satisfied will apply.

The rule-based model may take various forms and may be generated in different ways. For example, the rule-based model may comprise a collection of user-defined rules that are defined by a user (e.g., by entering rule data through a user interface). In another example, the rule-based model may be an association-rule model that is generated by applying an association-rule training technique such as FP-Growth, Eclat, Apriori, or some other training technique for generating association rules. In yet another example, the rule-based model may be a hybrid model that includes both association rules generated via training and user-defined rules defined based on user input. The rule-based model may also take other forms.

While the predictive analytics pipeline 400 may predict the one or more nutrient levels based on spectrometry data and generate one or more recommendations based on those predicted nutrient levels, the predictive analytics pipeline 400 may also be configured to output other types of predictions as well.

As one possibility, the predictive analytics pipeline 400 may also include an additional model stage and/or additional AI models that are configured to predict one or more properties (e.g., sensory properties related to appearance, aroma, flavor, texture, and/or aftertaste, chemical properties such as acidity, etc., among other possibilities) of cocoa beans that have been or will be produced by the given cocoa tree from which a given leaf sample being evaluated was taken. For instance, a first additional AI model may be configured to predict one or more properties of cocoa beans based on the spectrometry data (e.g., as found in the input data 412), the predicted levels of nutrients found in the output 414, the recommendations included in the output 424, or any combination thereof. Optionally, the first additional AI model may be trained to predict the one or more properties based on an assumption that recommendations includes in the output 424 will be implemented, while a second additional AI model maybe configured to predict the one or more properties based on an assumption that recommendations included in the output 424 will not be implemented. The predictions provided by the first additional AI model and the second additional AI model may help a user decide whether to implement the recommendations by demonstrating how the one or more properties would be affected if the recommendations were to be implemented.

As another possibility, an additional AI model may be configured to predict one or more properties of cocoa beans that have been or will be produced by the given cocoa tree based on not just the given leaf sample, but on a time series of leaf samples collected from the given cocoa tree. Each particular leaf sample in the time series may be associated with a respective set of spectrometry data, a respective set of predicted nutrient levels, and/or a respective set of recommendations. Furthermore, each particular leaf sample may be associated with a respective set of timestamps that indicate when the spectrometry data was collected from the particular leaf sample, when the respective set of predicted nutrient levels was determined, and/or when the respective set of recommendations was determined, among other possibilities. The additional AI model may receive the respective sets of spectrometry data, the respective sets of predicted nutrient levels, the respective sets of recommendations, the respective sets of timestamps, or any combination thereof as input and predict the one or more properties based on this input. Configuring the additional AI model to predict the one or more properties based on a time series in this manner may increase prediction accuracy as compared with AI models that use a single leaf sample. One reason this may be the case is because target levels for some nutrients may vary throughout different stages of a growth season. If target levels of those nutrients are not achieved at any particular stage, the one or more properties may be affected even if target levels of those nutrients are achieved during other stages of the growth season. On the other hand, if target levels of those nutrients are achieved at each stage, the one or more properties may benefit more than would generally be predicted based on a single leaf sample collected during a single stage of the growth season.

The predictive analytics pipeline 400 may also include other model stages and/or AI models that are configured to make other kinds of predictions as well.

Further, the one or more recommendations that are output by the second model stage 420 can be used in any of several ways. For example, a computing platform (e.g., such as the computing platform 110 of FIG. 1) that implements the predictive analytics pipeline 400 may cause the one or more recommendations and/or predicted nutrient levels to be presented to an individual involved in managing and overseeing the health of the given cocoa tree. The manner of causing the one or more recommendations and/or predicted nutrient levels to be presented may take any of various forms. As one possibility, the computing platform may transmit a communication to a client device (e.g., the client device 112 of FIG. 1) via a communication path (e.g., one or more networks and/or data links) that instructs and causes the client device to display an indication of the one or more recommendations and/or predicted nutrient levels on a screen associated with the client device. For example, the communication may comprise a message configured to instruct and/or trigger the client device to display the indication. The manner of causing the one or more recommendations to be presented may also take other forms.

In addition or alternatively, the computing platform that implements the predictive analytics pipeline 400 may use the one or more recommendations as a basis for transmitting a communication comprising one or more instructions to equipment associated with the given cocoa tree. The equipment may take any of various forms. For example, the equipment may comprise automated irrigation equipment (e.g., a drip irrigation system, a sprinkler system, a configurable machine such as a FarmBot® that can dispense water, etc.), automated fertilization equipment (e.g., a drone, a FarmBot®, or some other configurable machine that can dispense fertilizer), and/or automated disease-treatment equipment (e.g., a drone or another configurable machine that can dispense pesticides, fungicides, or other substances for treating diseases) via one or more communication paths (e.g., one or more networks and/or data links). The equipment may also take other forms.

The one or more instructions may cause the equipment to perform one or more actions associated with the one or more recommendations. For instance, the instruction may cause the equipment to update a frequency at which to dispense fertilizer, water, and/or disease treatment to the given cocoa tree; an amount of fertilizer, water, and/or disease treatment to dispense at each interval defined by the frequency; a time of day at which fertilizer, water, and/or disease treatment is to be applied; and/or some other parameter that controls the equipment. In one example, the equipment may comprise one or more Internet of Things (IoT) devices.

In line with the discussion above, the foregoing functionality may be utilized to create a predictive analytics pipeline for (i) predicting one or more nutrient levels (e.g., nitrogen, phosphorus, potassium, or water) of a cocoa tree and (ii) generating and outputting one or more recommendations for treating the cocoa tree based on the predicted one or more nutrient levels. For instance, the computing platform 110 of FIG. 1 (or another computing platform) may be configured to create the disclosed predictive analytics pipeline (e.g., by training one or AI models for use in the pipeline in the manner described above) and to transmit communications that cause one or more recommendations output by the disclosed predictive analytics pipeline to be presented to a user or that cause equipment to perform one or more actions indicated by the one or more recommendations.

Figure 5:
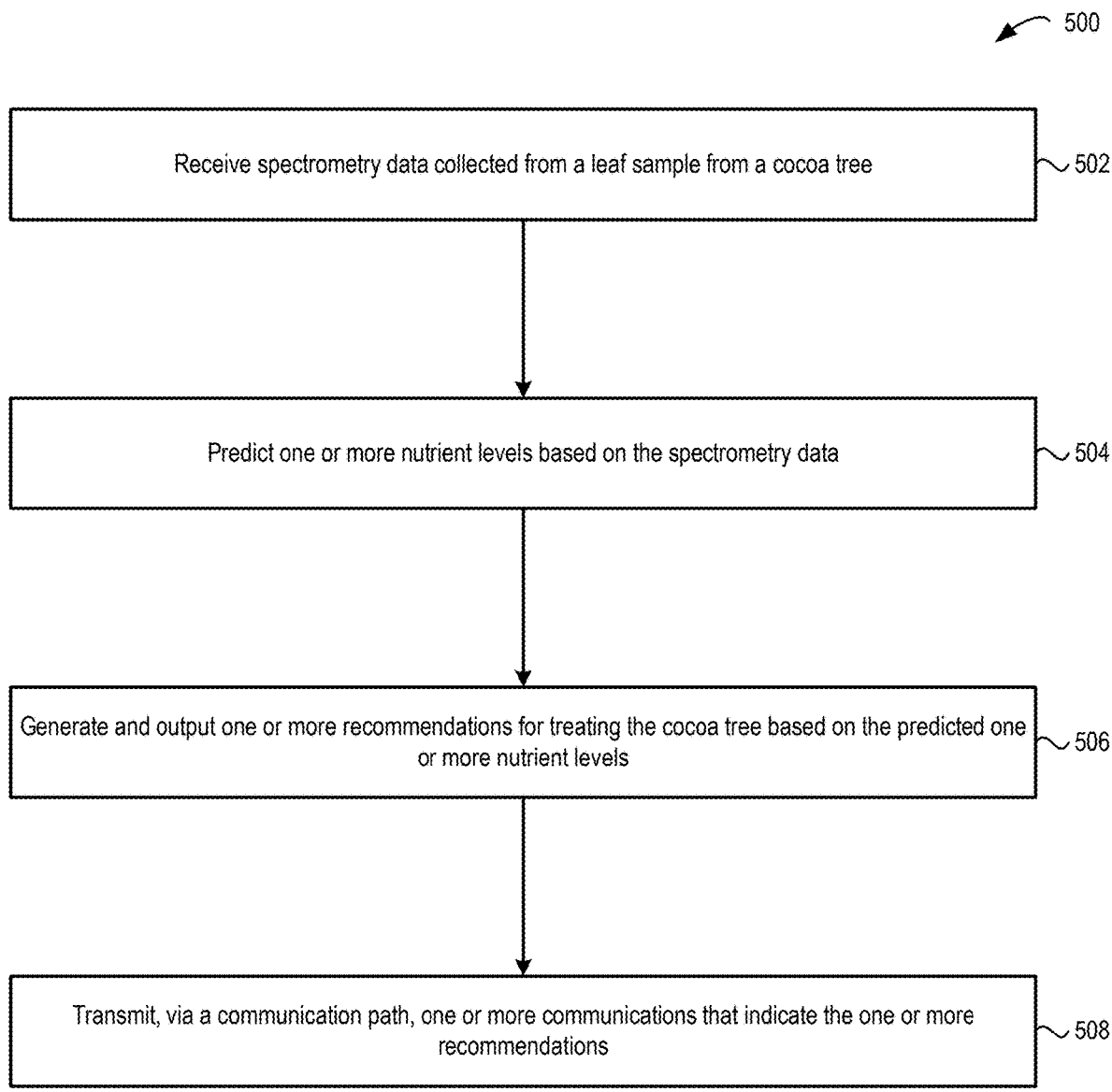
FIG. 5 depicts one possible implementation of functionality that may be carried out in order to (i) predict one or more nutrient levels of a cocoa tree and (ii) generate and output one or more recommendations for treating the cocoa tree based on the predicted one or more nutrient levels utilizing the predictive analytics pipeline in accordance with the present disclosure.

After a predictive analytics pipeline has been created, the functionality that may be carried out in order to (i) predict one or more nutrient levels (e.g., nitrogen, phosphorus, potassium, or water) of a cocoa tree and (ii) generate and output one or more recommendations for treating the cocoa tree based on the predicted one or more nutrient levels utilizing the predictive analytics pipeline may take any of various forms, and one possible implementation of that functionality is illustrated in FIG. 5. For purposes of illustration, the example functionality 500 of FIG. 5 is described as being carried out by the computing platform 110 of FIG. 1, but it should be understood that the example functionality 500 of FIG. 5 may be carried out by any computing platform that is capable of running the software disclosed herein. Further, it should be understood that the example functionality 500 of FIG. 5 is merely described in this manner for the sake of clarity and explanation and that the example functionality 500 may be implemented in various other manners, including the possibility that functions may be added, removed, rearranged into different orders, combined into fewer blocks, and/or separated into additional blocks depending upon the particular example.

As shown in FIG. 5, the example functionality 500 may begin at block 502 with the computing platform 110 receiving spectrometry data collected from a leaf sample from a cocoa tree via a measurement system (e.g., comprising a spectrometer). The spectrometry data may be received in the form of a communication transmitted from the measurement system 104 over a communication path, such as a communication from the client device 108 or the spectrometer 106 itself. The spectrometry data may comprise measurements taken by the spectrometer for any of various spectrums of interest, such as the full EMR spectrum or any spectrum that is a subdivision of the EMR spectrum, examples of which may include the NIR spectrum, the visible spectrum, the gamma spectrum, the X-ray spectrum, the ultraviolet spectrum, the infrared spectrum, the microwave spectrum, or any combination of one or more wavelengths and/or spectral ranges selected from any of these spectrums (e.g., a combination of the visible and NIR spectrums). For instance, a combination of wavelengths may include wavelengths that are separated by increments of a predefined length (e.g., one nanometer, five nanometers, etc.) within a spectral range. Many other examples are possible as well.

Furthermore, the leaf sample may take any of various forms. For instance, the leaf sample may include one or more leaves that remained attached to the cocoa tree while the measurements were taken by the spectrometer, one or more leaves that were removed from the cocoa tree before the measurements were taken, or a powder that was formed by drying and grinding one or more leaves that were removed from the cocoa tree before the measurements were taken.

Further still, the measurements taken by the measurement system (e.g., comprising a spectrometer) may have been taken on a plurality of different target points distributed across the leaf sample. The target points may be spaced relative to one another in any of various ways. For instance, the target points may be arranged in a circular pattern (including a target point in the center of the circle and a plurality of target points arranged along the perimeter of the circle), a grid pattern, or a random pattern, among other possibilities.

The function of receiving the spectrometry data—and the form of the received spectrometry data, make take various other forms as well.

At block 504, after the spectrometry data has been received, the computing platform 110 may utilize the first modeling stage of the disclosed predictive analytics pipeline to predict one or more nutrient levels based on the spectrometry data. For instance, the computing platform 110 may provide the spectrometry data as input to the first modeling stage, which may in turn function to (i) optionally pre-process the spectrometry data, (ii) input the spectrometry data into the one or more AI models of the first modeling stage, and (iii) based on the analysis of the one or more AI models, predict and output one or more nutrient levels.

At block 506, after the one or more nutrient levels have been predicted utilizing the first model stage of the disclosed predictive analytics pipeline, the computing platform utilize the second model stage of the disclosed predictive analytics pipeline to generate and output one or more recommendations for treating the cocoa tree based on the predicted one or more nutrient levels output by the first model stage. For instance, the computing platform 110 may provide the predicted one or more nutrient levels to the second model stage, which may in turn function to (i) optionally pre-process the predicted one or more nutrient levels, (ii) input the predicted one or more nutrient levels into the one or more AI models of the second modeling stage, and (iii) based on the analysis of the one or more AI models, generate and output one or more recommendations for treating the cocoa tree.

In line with the discussion above, the one or more recommendations may take any of various forms. For instance, as one possibility, the one or more recommendations may include a recommendation related to fertilization for the given cocoa tree, such as whether one or more fertilizers should be applied, how much of each of the one or more fertilizers should be applied, a form in which each of the one or more fertilizers should be applied, a frequency with which the one or more fertilizers should be applied, which ingredients to include in the one or more fertilizers to be applied, and/or one or more suggested ratios of the ingredients to one another, among other possibilities. As another possibility, the one or more recommendations may include a recommendation related to treatments for disease, such as whether specific fungicides, pesticides, phages, salicylic acid, antibiotics, etc. should be applied, among other possibilities. As yet another possibility, the one or more recommendations may include a recommendation related to irrigation, such as whether any water should be supplied via irrigation (e.g., as opposed to supplied naturally via precipitation such as rainfall), one or more forms in which water should be supplied (e.g., via sprinklers, drip irrigation, etc.), a frequency at which water should be supplied (e.g., hourly, daily, weekly, monthly, bimonthly, etc.), an amount of water to provide each time water is supplied (e.g., in liters, gallons, etc.), a time of day in which water should be supplied, and/or a location where water should be supplied relative to the given cocoa tree (e.g., at a radius of a certain distance from the center of the tree trunk, etc.), among other possibilities. The one or more recommendations may take other forms as well.

At block 508, the computing platform may transmit, via a communication path, one or more communications that indicate the one or more recommendations. (The one or more communications may also indicate the predicted one or more nutrient levels as predicted in block 504.) The one or more communications may be transmitted to any of various types of devices.

As one possibility, the one or more communications may be transmitted to a client device associated with an individual involved in managing and overseeing the health of the cocoa tree to cause the client device to present the one or more recommendations (and/or the predicted one or more nutrient levels) to the individual (e.g., via a screen or a speaker, among other possibilities).

As another possibility, the one or more communications may be transmitted to equipment associated with the cocoa tree to cause the equipment to perform one or more actions in accordance with the one or more recommendations. As noted above, such equipment may take any of various forms, examples of which may include automated irrigation equipment (e.g., a drip irrigation system, a sprinkler system, a configurable machine such as a FarmBot® that can dispense water, etc.), automated fertilization equipment (e.g., a drone, a FarmBot®, or some other configurable machine that can dispense fertilizer), and/or automated disease-treatment equipment (e.g., a drone or another configurable machine that can dispense pesticides, fungicides, or other substances for treating diseases), among other possibilities. Further, in line with the discussion above, the one or more communications may cause the equipment to update a frequency at which to dispense fertilizer, water, and/or disease treatment to the cocoa tree; an amount of fertilizer, water, and/or disease treatment to dispense at each interval defined by the frequency; a time of day at which fertilizer, water, and/or disease treatment is to be applied; and/or some other parameter that controls the equipment, among other possibilities.

The disclosed functionality for predicting one or more nutrient levels of a cocoa tree and then generating and outputting one or more recommendations for treating the cocoa tree based on the predicted one or more nutrient levels may take various other forms as well.

Figure 6:
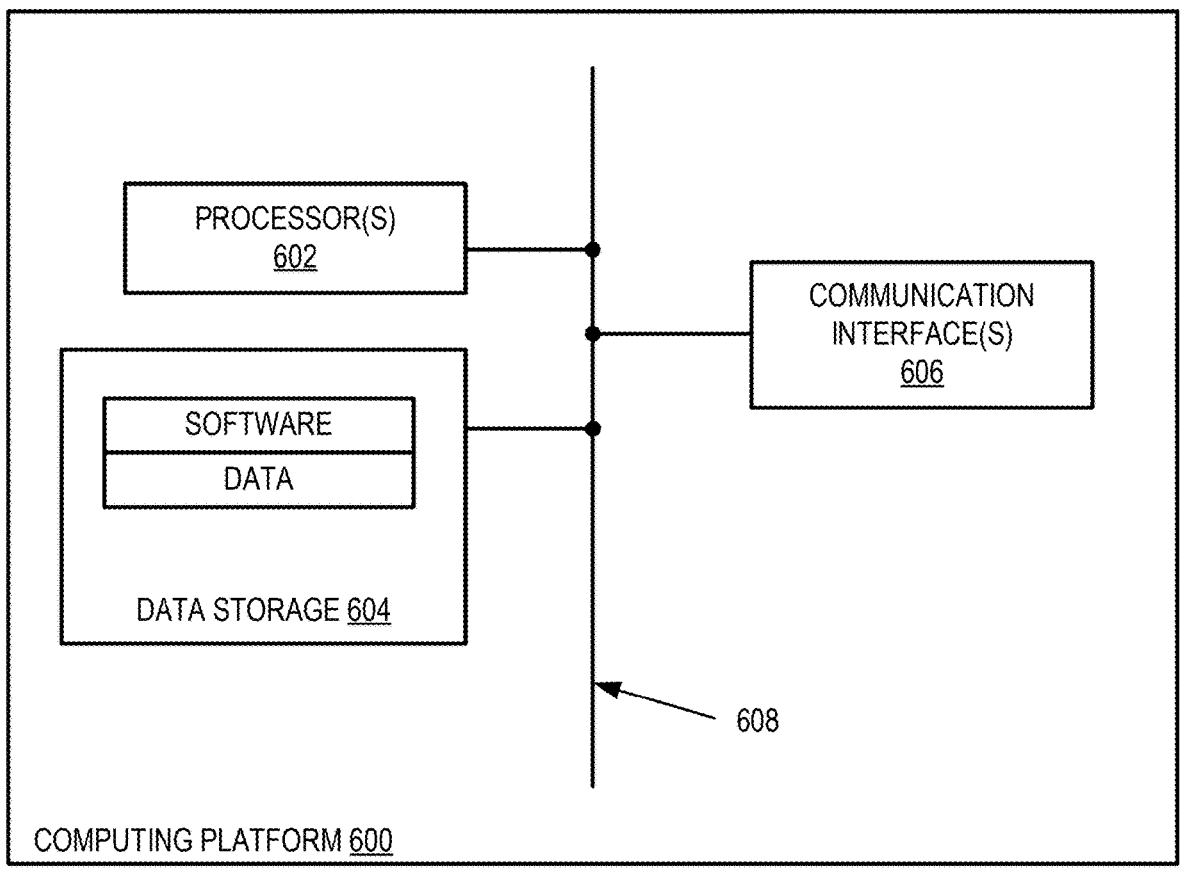
FIG. 6 depicts a simplified block diagram is provided to illustrate some structural components that may be included in an example computing platform that may be configured to perform the platform-side functions disclosed herein.

Turning now to FIG. 6, a simplified block diagram is provided to illustrate some structural components that may be included in an example computing platform 600 that may be configured to perform the platform-side functions disclosed herein. At a high level, the example computing platform 600 may generally comprise any one or more computer systems (e.g., one or more servers) that collectively include one or more processors 602, data storage 604, and one or more communication interfaces 606, each of which may be communicatively linked by a communication link 608 that may take the form of a system bus, a communication network such as a public, private, or hybrid cloud, or some other connection mechanism. Each of these components may take various forms.

For instance, the one or more processors 602 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 602 could comprise processing components that are distributed across a plurality of physical computing devices connected via a network, such as a computing cluster of a public, private, or hybrid cloud.

In turn, the data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, the data storage 604 may be capable of storing both (i) program instructions that are executable by the one or more processors 602 such that the example computing platform 600 is configured to perform any of the various functions disclosed herein (including but not limited to any of the platform-side functions discussed above), and (ii) data that may be received, derived, or otherwise stored by the example computing platform 600.

The one or more communication interfaces 606 may comprise one or more interfaces that facilitate communication between the example computing platform 600 and other systems or devices, where each such interface may be wired and/or wireless and may communicate according to any of various communication protocols. As examples, the one or more communication interfaces 606 may take include an Ethernet interface, a serial bus interface (e.g., Firewire, USB (Universal Serial Bus) 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 600 may additionally have an Input/Output (I/O) interface that includes or provides connectivity to I/O components that facilitate user interaction with the example computing platform 600, such as a keyboard, a mouse, a trackpad, a display screen, a touch-sensitive interface, a stylus, a virtual-reality headset, and/or one or more speaker components, among other possibilities.

It should be understood that the example computing platform 600 is one example of a computing platform that may be used with the examples described herein. Numerous other arrangements are possible and contemplated herein. For instance, in other examples, the example computing platform 600 may include additional components not pictured and/or more or less of the pictured components.

Figure 7:
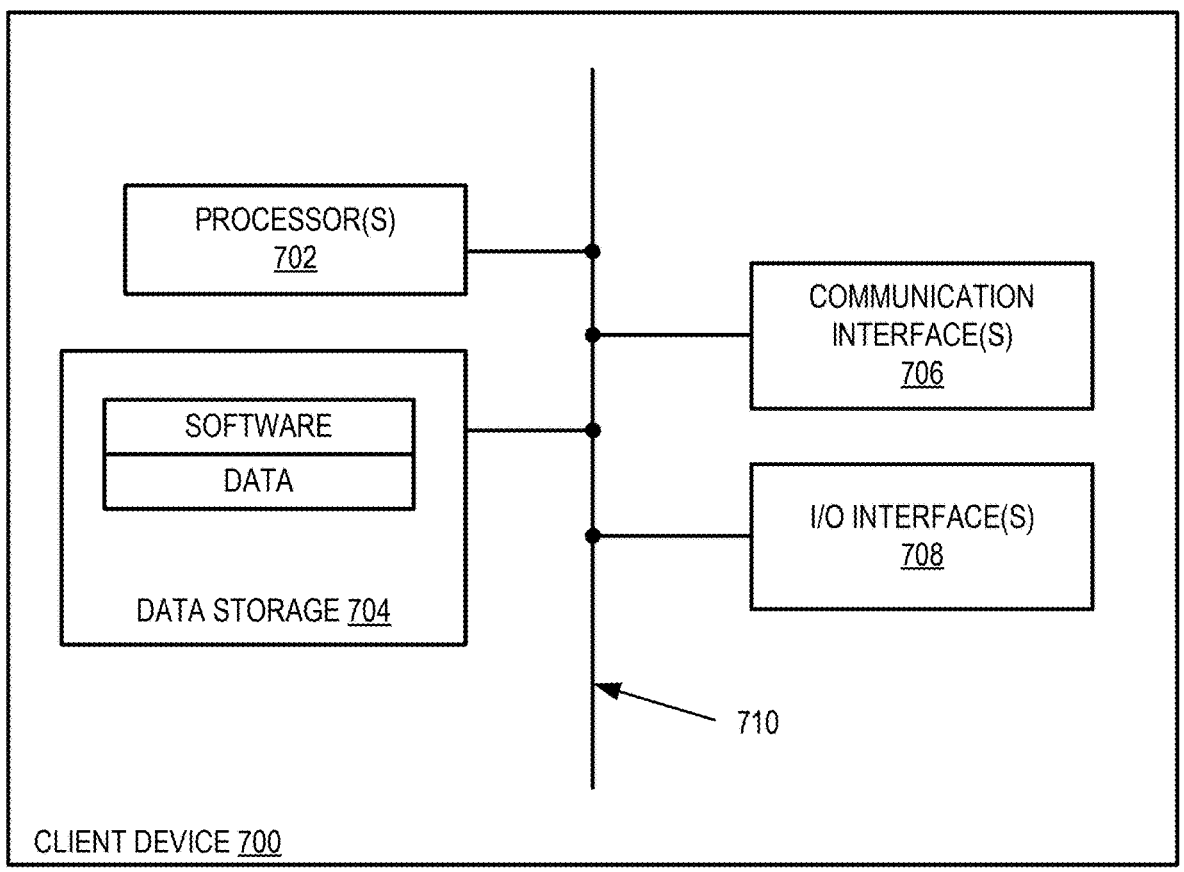
FIG. 7 depicts a simplified block diagram is provided to illustrate some structural components that may be included in an example client device that may be configured to perform some the client-side functions disclosed herein.

Turning next to FIG. 7, a simplified block diagram is provided to illustrate some structural components that may be included in an example client device 700 that may be configured to perform some the client-side functions disclosed herein. At a high level, the example client device 700 may include one or more processors 702, data storage 704, one or more communication interfaces 706, and an I/O interface 708, each of which may be communicatively linked by a communication link 710 that may take the form a system bus and/or some other connection mechanism. Each of these components may take various forms.

For instance, the one or more processors 702 of the example client device 700 may comprise one or more processor components, such as one or more CPUs, GPUs, ASICs, DSPs, and/or programmable logic devices such as FPGAs, among other possible types of processing components.

In turn, the data storage 704 of the example client device 700 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 7, the data storage 704 may be capable of storing both (i) program instructions that are executable by the one or more processors 702 of the example client device 700 such that the example client device 700 is configured to perform any of the various functions disclosed herein (including but not limited to any of the client-side functions discussed above), and (ii) data that may be received, derived, or otherwise stored by the example client device 700.

The one or more communication interfaces 706 may comprise one or more interfaces that facilitate communication between the example client device 700 and other systems or devices, where each such interface may be wired and/or wireless and may communicate according to any of various communication protocols. As examples, the one or more communication interfaces 706 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 708 may generally take the form of (i) one or more input interfaces that are configured to receive and/or capture information at the example client device 700 and (ii) one or more output interfaces that are configured to output information from the example client device 700 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 708 may include or provide connectivity to output components such as a display screen and/or an audio speaker, among other possibilities.

It should be understood that the example client device 700 is one example of a client device that may be used with the examples described herein. Numerous other arrangements are possible and contemplated herein. For instance, in other examples, the example client device 700 may include additional components not pictured and/or more or fewer of the pictured components.

CONCLUSION

This disclosure makes reference to the accompanying figures and several examples. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computing platform comprising:
   at least one network interface;
   at least one processor;
   at least one non-transitory computer-readable medium; and
   program instructions stored on the at least one non-transitory computer-readable medium that are executable by the at least one processor such that the computing platform is configured to:
   receive spectrometry data for a leaf sample of a cocoa tree, wherein the spectrometry data was generated by a spectrometer by (i) emitting electromagnetic radiation (EMR) within a given spectrum towards the leaf sample, (ii) measuring an extent of the EMR that was absorbed by the leaf sample at respective wavelengths within the given spectrum, and (iii) generating the spectrometry data based on the measured extent of the EMR that was absorbed by the leaf sample;

utilize a first set of one or more artificial intelligence (AI) models to predict one or more nutrient levels for the leaf sample based on the spectrometry data;

utilize a second set of one or more AI models to generate one or more recommendations for treating the cocoa tree based on the one or more nutrient levels; and cause the one or more recommendations to be presented to an individual involved in managing the cocoa tree, wherein the cocoa tree is thereafter treated in accordance with the one or more recommendations.

2. The computing platform of claim 1, wherein the one or more recommendations comprise at least one of: a type of fertilizer to apply, an amount of fertilizer to apply, a form in which fertilizer is to be applied, a frequency with which fertilizer is to be applied, an ingredient to include in fertilizer to be applied, or a ratio of a first ingredient to a second ingredient in a fertilizer to be applied.

3. The computing platform of claim 1, wherein the one or more recommendations comprise a treatment to be applied for a disease.

4. The computing platform of claim 1, wherein the one or more recommendations comprise at least one of: an indication of whether water is to be supplied via irrigation, one or more forms in which water is to be supplied via irrigation, a frequency at which water is to be supplied via irrigation, an amount of water to provide each time water is supplied via irrigation, a time of day in which water is to be supplied via irrigation, or a location where water is to be supplied via irrigation relative to the cocoa tree.

5. The computing platform of claim 1, wherein the spectrometry data comprises measurements within a visible spectrum and a near-infrared (NIR) spectrum.

6. The computing platform of claim 1, wherein the leaf sample was selected from a middle third of a canopy of the cocoa tree.

7. The computing platform of claim 1, wherein the spectrometry data comprises measurements taken on a plurality of target points distributed in a circular pattern across a leaf in the leaf sample.

8. The computing platform of claim 1, wherein the first set of one or more AI models comprises a first set of one or more trained machine-learning models and the second set of one or more AI models comprises a second set of one or more trained machine-learning models.

9. The computing platform of claim 1, wherein the one or more nutrient levels comprises one or more of a nitrogen level, a phosphorus level, a potassium level, or a water level.

10. The computing platform of claim 1, wherein the spectrometry data comprises measurements on one or more leaves in the leaf sample that were prepared via a preparation process prior to collection of the spectrometry data, and wherein the preparation process comprises one or more of: rinsing the one or more leaves, drying the one or more leaves, or grinding the one or more leaves into a powder.

11. The computing platform of claim 1, further comprising program instructions stored on the at least one non-transitory computer-readable medium that are executable by the at least one processor such that the computing platform is configured to:

based on the one or more recommendations, transmit one or more instructions for controlling equipment that is configured to treat the cocoa tree.

12. A non-transitory computer-readable medium comprising program instructions that, when executed by at least one processor, cause a computing platform to:

receive spectrometry data for a leaf sample of a cocoa tree, wherein the spectrometry data was generated by a spectrometer by (i) emitting electromagnetic radiation (EMR) within a given spectrum towards the leaf sample, (ii) measuring an extent of the EMR that was absorbed by the leaf sample at respective wavelengths within the given spectrum, and (iii) generating the spectrometry data based on the measured extent of the EMR that was absorbed by the leaf sample;

utilize a first set of one or more artificial intelligence (AI) models to predict one or more nutrient levels for the leaf sample based on the spectrometry data;

utilize a second set of one or more AI models to generate one or more recommendations for treating the cocoa tree based on the one or more nutrient levels; and cause the one or more recommendations to be presented to an individual involved in managing the cocoa tree, wherein the cocoa tree is thereafter treated in accordance with the one or more recommendations.

13. The non-transitory computer-readable medium of claim 12, wherein the one or more recommendations comprise at least one of: a type of fertilizer to apply, an amount of fertilizer to apply, a form in which fertilizer is to be applied, a frequency with which fertilizer is to be applied, an ingredient to include in fertilizer to be applied, or a ratio of a first ingredient to a second ingredient in a fertilizer to be applied.

14. The non-transitory computer-readable medium of claim 12, wherein the one or more recommendations comprise a treatment to be applied for a disease.

15. The non-transitory computer-readable medium of claim 12, wherein the one or more recommendations comprise at least one of: an indication of whether water is to be supplied via irrigation, one or more forms in which water is to be supplied via irrigation, a frequency at which water is to be supplied via irrigation, an amount of water to provide each time water is supplied via irrigation, a time of day in which water is to be supplied via irrigation, or a location where water is to be supplied via irrigation relative to the given cocoa tree.

16. The non-transitory computer-readable medium of claim 12, wherein the spectrometry data comprises measurements within a visible spectrum and a near-infrared (NIR) spectrum.

17. The non-transitory computer-readable medium of claim 12, wherein the leaf sample was selected from a middle third of a canopy of the cocoa tree.

18. The non-transitory computer-readable medium of claim 12, wherein the spectrometry data comprises measurements taken on a plurality of target points distributed in a circular pattern across a leaf in the leaf sample.

19. The non-transitory computer-readable medium of claim 12, wherein the first set of one or more AI models comprises a first set of one or more trained machine-learning models and the second set of one or more AI models comprises a second set of one or more trained machine-learning models.

20. The non-transitory computer-readable medium of claim 12, wherein the one or more nutrient levels comprises one or more of a nitrogen level, a phosphorus level, a potassium level, or a water level.

21. A computer-implemented method comprising:
receiving spectrometry data for a leaf sample of a cocoa tree, wherein the spectrometry data was generated by a spectrometer by (i) emitting electromagnetic radiation (EMR) within a given spectrum towards the leaf sample, (ii) measuring an extent of the EMR that was absorbed by the leaf sample at respective wavelengths within the given spectrum, and (iii) generating the spectrometry data based on the measured extent of the EMR that was absorbed by the leaf sample;
utilizing a first set of one or more artificial intelligence (AI) models to predict one or more nutrient levels for the leaf sample based on the spectrometry data;
utilizing a second set of one or more AI models to generate one or more recommendations for treating the cocoa tree based on the one or more nutrient levels; and
causing the one or more recommendations to be presented to an individual involved in managing the cocoa tree, wherein the cocoa tree is thereafter treated in accordance with the one or more recommendations.

\* \* \* \* \*